United States Patent
Kang et al.

(10) Patent No.: US 10,003,442 B2
(45) Date of Patent: Jun. 19, 2018

(54) METHOD FOR PERFORMING PRECODING FOR ADAPTIVE ANTENNA SCALING IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Jaehoon Chung, Seoul (KR); Kilbom Lee, Seoul (KR); Ilmu Byun, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 14/898,439

(22) PCT Filed: Jun. 24, 2014

(86) PCT No.: PCT/KR2014/005564
§ 371 (c)(1),
(2) Date: Dec. 14, 2015

(87) PCT Pub. No.: WO2014/208974
PCT Pub. Date: Dec. 31, 2014

(65) Prior Publication Data
US 2016/0149680 A1 May 26, 2016

Related U.S. Application Data

(60) Provisional application No. 61/838,887, filed on Jun. 25, 2013, provisional application No. 61/859,787, (Continued)

(51) Int. Cl.
*H04W 4/00* (2009.01)
*H04L 5/00* (2006.01)
(Continued)

(52) U.S. Cl.
CPC ......... *H04L 5/0048* (2013.01); *H04B 7/0417* (2013.01); *H04B 7/0452* (2013.01);
(Continued)

(58) Field of Classification Search
CPC .................................................... H04B 7/0417
(Continued)

(56) References Cited

U.S. PATENT DOCUMENTS

2011/0223876 A1  9/2011  Kang
2011/0261710 A1  10/2011 Yu et al.
(Continued)

FOREIGN PATENT DOCUMENTS

| CN | 102356578 | 12/2012 |
|---|---|---|
| JP | 2010219817 | 9/2010 |
| WO | 2011/047351 | 4/2011 |

OTHER PUBLICATIONS

European Patent Office Application Serial No. 14816795.0, Search Report dated Jan. 16, 2017, 8 pages.
(Continued)

*Primary Examiner* — Shripal Khajuria
(74) *Attorney, Agent, or Firm* — Lee, Hong, Degerman, Kang & Waimey

(57) ABSTRACT

A method for transmitting a signal to a receiver by a transmitter in a wireless communication system is disclosed. The method includes mapping one or more transmission steams to first logical antenna ports, mapping signals mapped to the first logical antenna ports to second logical antenna ports, and mapping signals mapped to the second logical antenna ports to physical antennas to transmit the signals mapped to the physical antennas to the receiver, wherein the number of the first logical antenna ports is less
(Continued)

than or equal to the number of the second logical antenna ports and varies with a channel state between the transmitter and the receiver.

12 Claims, 16 Drawing Sheets

Related U.S. Application Data filed on Jul. 30, 2013, provisional application No. 61/859,792, filed on Jul. 30, 2013, provisional application No. 61/876,774, filed on Sep. 12, 2013.

(51) Int. Cl.
    *H04B 7/0417*     (2017.01)
    *H04B 7/0452*     (2017.01)
    *H04B 7/0456*     (2017.01)
    *H04B 7/06*     (2006.01)

(52) U.S. Cl.
    CPC ........... *H04B 7/0456* (2013.01); *H04B 7/063* (2013.01); *H04B 7/0626* (2013.01); *H04B 7/0639* (2013.01); *H04L 5/0051* (2013.01)

(58) Field of Classification Search
    USPC .......................................................... 370/329
    See application file for complete search history.

(56) References Cited

U.S. PATENT DOCUMENTS

| | | |
|---|---|---|
| 2012/0009959 A1 | 1/2012 | Yamada et al. |
| 2012/0039298 A1 | 2/2012 | Lee et al. |
| 2012/0106501 A1 | 5/2012 | Kishiyama et al. |
| 2012/0201282 A1 | 8/2012 | Li et al. |
| 2012/0218911 A1 | 8/2012 | Zhu et al. |

OTHER PUBLICATIONS

PCT International Application No. PCT/KR2014/005564, Written Opinion of the International Searching Authority dated Oct. 8, 2014, 8 pages.

The State Intellectual Property Office of the People's Republic of China Application Serial No. 201480036209.1, Office Action dated Nov. 30, 2017, 6 pages.

FIG. 2
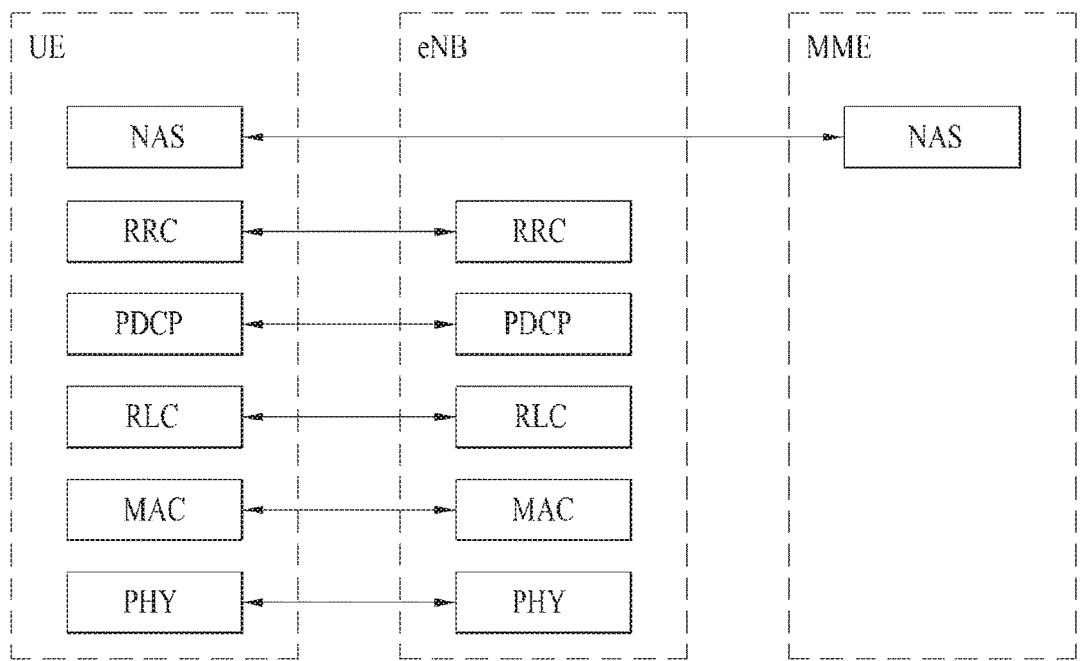
(A) CONTROL-PLANE PROTOCOL STACK
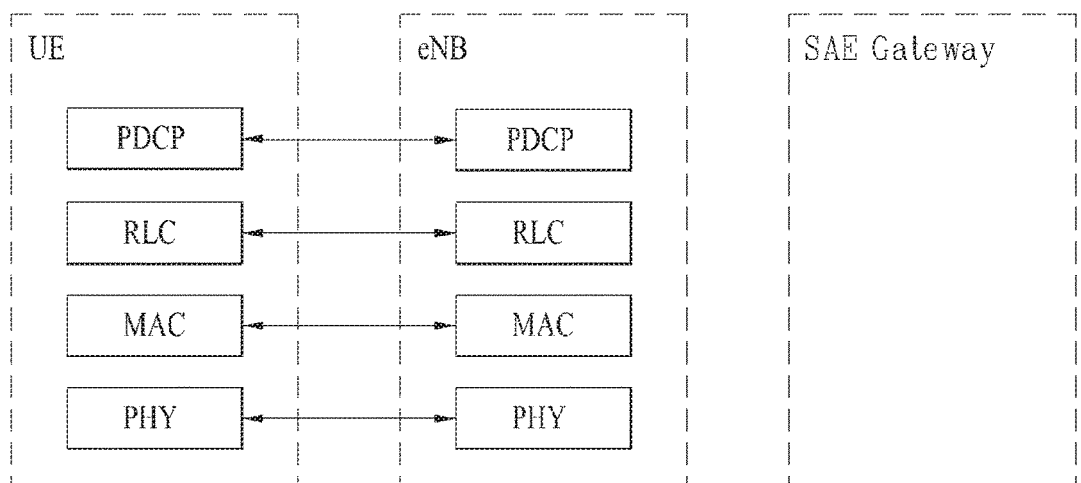
(B) USER-PLANE PROTOCOL STACK (a) CONVENTIONAL ANTENNA SYSTEM        (b) AAS CSI-RS resource 1 for Partition 1

CSI-RS resource 2 for Partition 2

CSI-RS resource Nt_v for Partition Nt_v

Linking coeff

CSI-RS resource 1 for Partition 1

CSI-RS resource 2 for linking coeff

METHOD FOR PERFORMING PRECODING FOR ADAPTIVE ANTENNA SCALING IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/005564, filed on Jun. 24, 2014, which claims the benefit of U.S. Provisional Application Nos. 61/838,887, filed on Jun. 25, 2013, 61/859,787, filed Jul. 30, 2013, 61/859,792, filed Jul. 30, 2013, and 61/876,774 filed on Sep. 12, 2013, the contents of which are all hereby incorporated by reference herein in their entirety.

TECHNICAL FIELD

The present invention relates to a wireless communication system and, more particularly, to a method for performing precoding for adaptive antenna scaling in a wireless communication system, and an apparatus therefor.

BACKGROUND ART

As an example of a mobile communication system to which the present invention is applicable, a 3rd generation partnership project long term evolution (hereinafter, referred to as LTE) communication system is described in brief FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention devised to solve the problem lies in providing a method for performing precoding for adaptive antenna scaling in a wireless communication system, and an apparatus therefor.

Technical Solution

A method for transmitting a signal to a receiver by a transmitter in a wireless communication system according to an embodiment of the present invention includes mapping one or more transmission steams to first logical antenna ports;

mapping signals mapped to the first logical antenna ports to second logical antenna ports; and mapping signals mapped to the second logical antenna ports to physical antennas to transmit the signals mapped to the physical antennas to the receiver, wherein the number of the first logical antenna ports is less than or equal to the number of the second logical antenna ports and varies with a channel state between the transmitter and the receiver.

The mapping signals to the second logical antenna ports may include mapping first non-precoded pilot signals to the second logical antenna ports and the mapping signals to the physical antennas may include mapping second non-precoded pilot signals to the physical antennas. The first non-precoded pilot signals may be pilot signals for channel state information measurement at the receiver and the second non-precoded pilot signals may be common pilot signals for determining the number of the first logical antenna ports.

The mapping signals to first logical antenna ports may include mapping receiver-specific precoded pilot signals to the first logical antenna ports.

The method may further include receiving information about a channel state between the transmitter and the receiver from the receiver to determine the number of the first logical antenna ports, or transmitting information about a mapping relationship between the first logical antenna ports and the second logical antenna ports to the receiver.

A transmitter in a wireless communication system according to another embodiment of the present invention includes a first precoder for mapping one or more transmission steams to first logical antenna ports; a second precoder for mapping signals mapped to the first logical antenna ports to second logical antenna ports; and a physical antenna mapper for mapping signals mapped to the second logical antenna ports to physical antennas to transmit the signals mapped to the second logical antenna ports, wherein the number of the first logical antenna ports is less than or equal to the number of the second logical antenna ports and varies with a channel state between the transmitter and the receiver.

The second precoder may map first non-precoded pilot signals to the second logical antenna ports and the physical antenna mapper may map second non-precoded pilot signals to the physical antennas. The first non-precoded pilot signals may be pilot signals for channel state information measurement at the receiver and the second non-precoded pilot signals may be common pilot signals for determining the number of the first logical antenna ports.

The first precoder may map receiver-specific precoded pilot signals to the first logical antenna ports.

The transmitter may receive information about a channel state between the transmitter and the receiver from the receiver to determine the number of the first logical antenna ports, or transmit information about a mapping relationship between the first logical antenna ports and the second logical antenna ports to the receiver.

Advantageous Effects

According to the embodiments of the present invention, pilot and feedback overhead can be adaptively optimized according to a radio channel situation in a transmission and reception structure using a massive antenna array.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
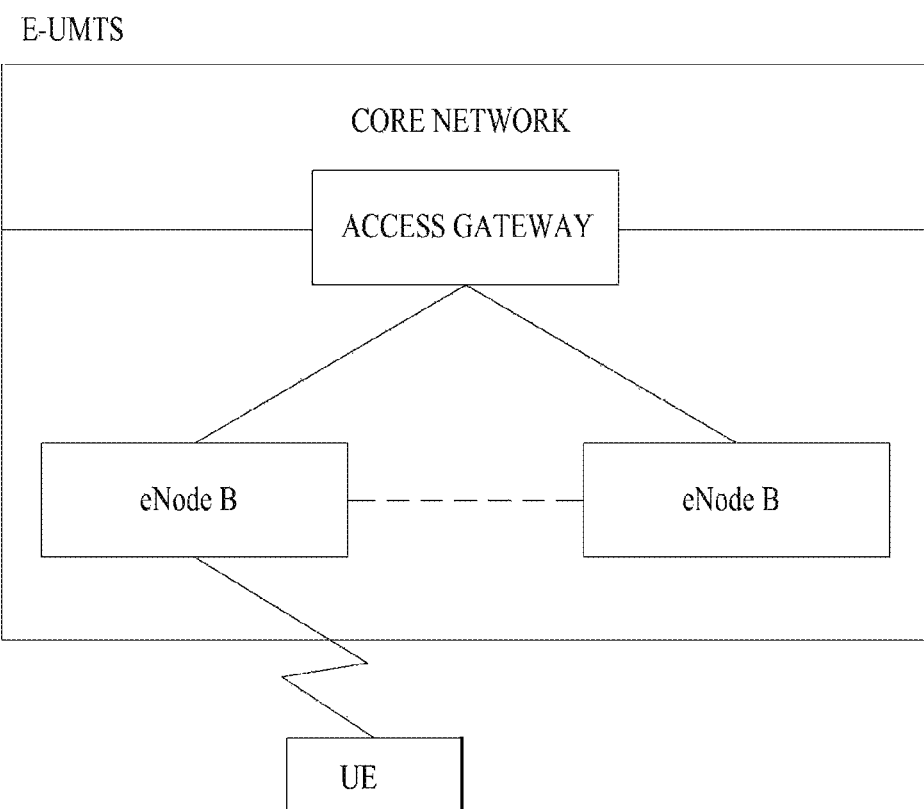
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
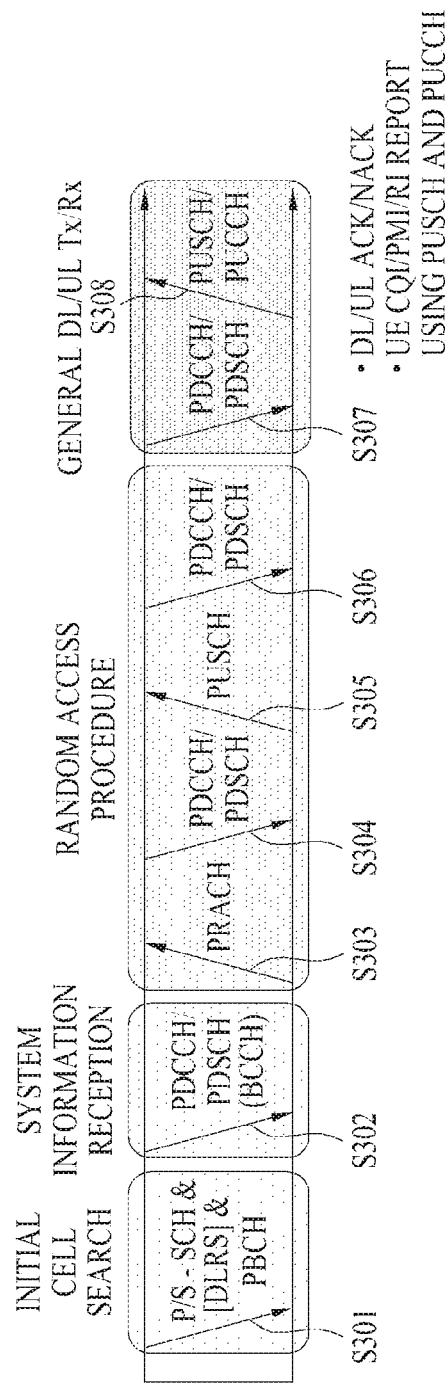
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI); and the like. In the 3GPP LTE system, the UE may transmit the control information such as CQI/PMI/RI through a PUSCH and/or a PUCCH.

Figure 4:
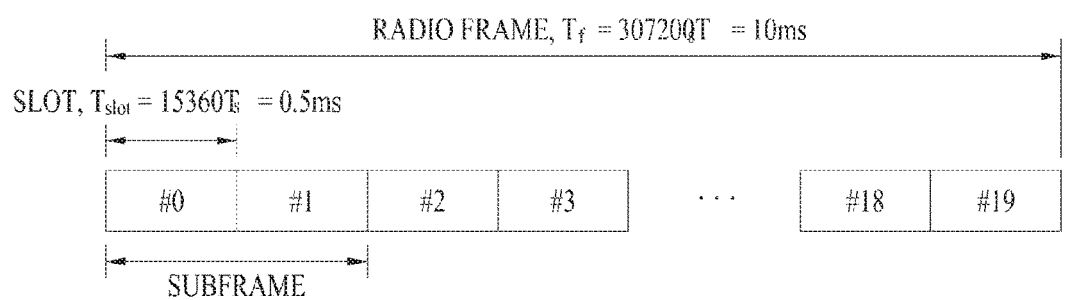
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
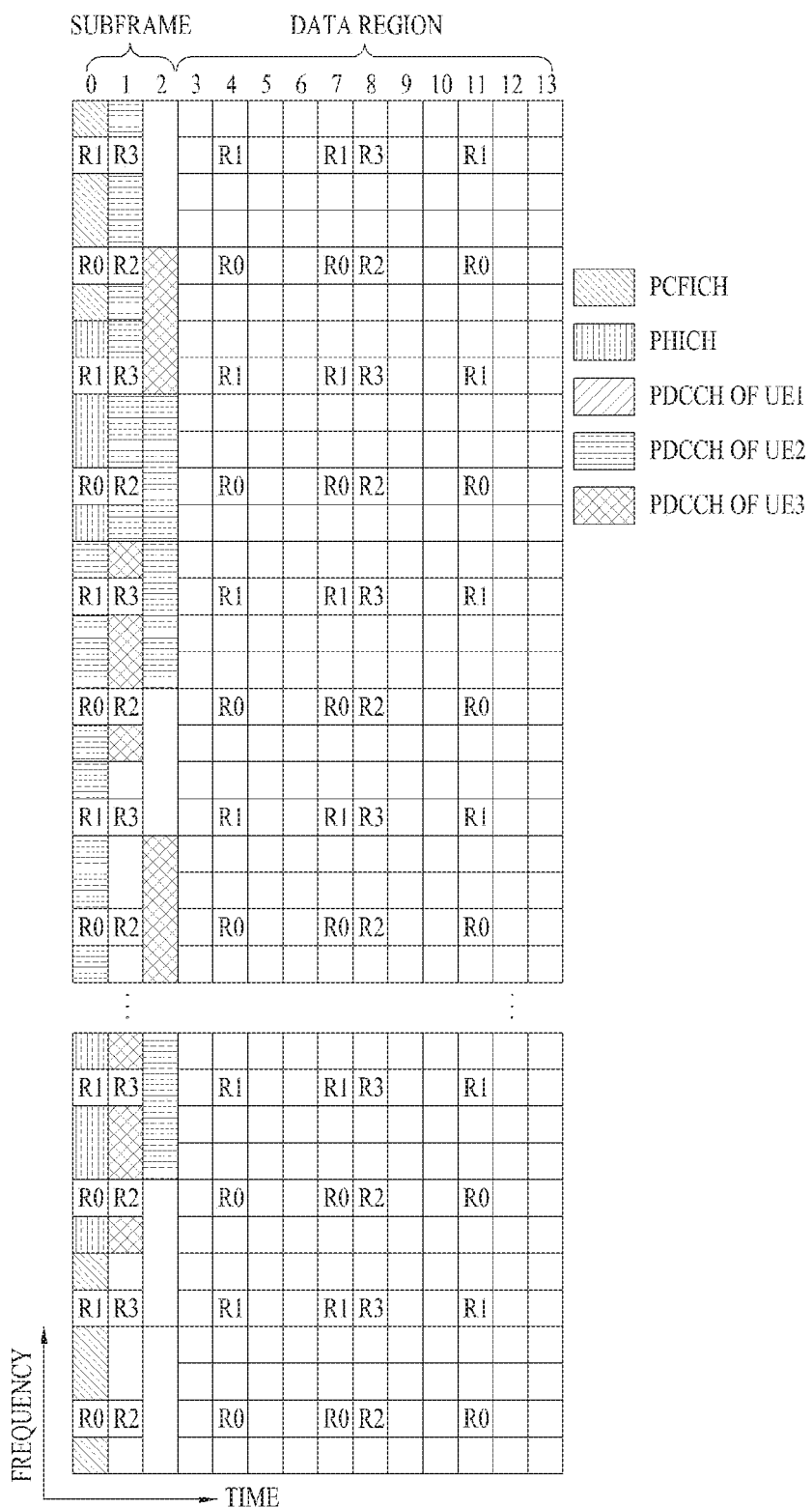
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
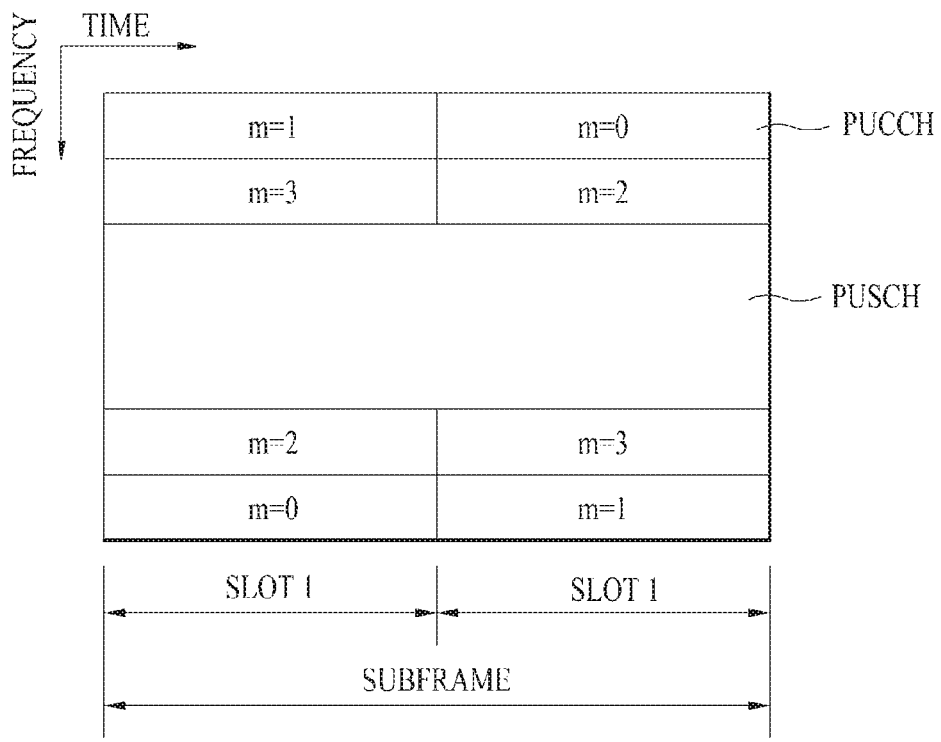
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
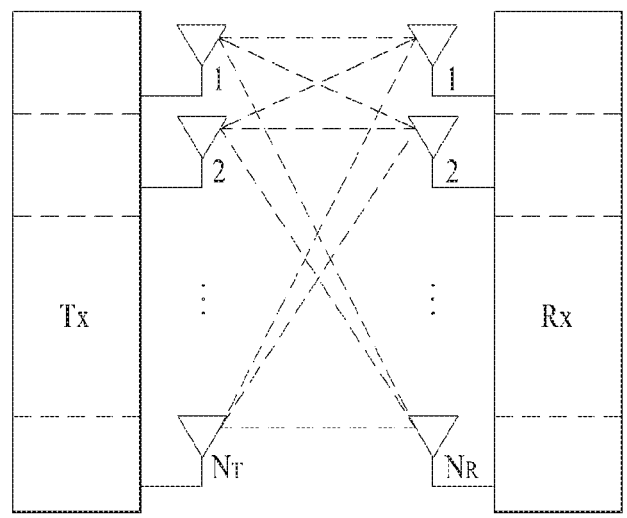
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots P_{N_T}$, respectively, then the transmission power-controlled transmission information may be given as $$\hat{s}=[\hat{s}_1,\hat{s}_2,\ldots,\hat{s}_{N_T}]^T=[P_1s_1, P_2s_2,\ldots, P_{N_T}s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\ W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\ columns} \text{(if rank = r)},$$

where $1 \leq k,l,m \leq M$ and k,l,m are integer.

In Equation 9, the codewords are designed so as to reflect correlation characteristics between established channels, if cross-polarized antennas are densely arranged, for example; the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where $N_T$ is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinbelow, transmission modes for a DL data channel will be described. A current 3GPP LTE standard specification, 3GPP TS 36.213, defines DL data channel transmission modes as illustrated in Table 1. A DL data channel transmission mode is indicated to a UE by higher-layer signaling, that is, RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to Table 1, the current 3GPP LTE standard specification defines transmission modes and DCI formats corresponding to the transmission modes. DCI format 1A is additionally defined for application irrespective of transmission modes, that is, for a fallback mode. As an example of operation regarding transmission modes, if DCI format 1B is detected as a result of blind-decoding a PDCCH in Table 1, a PDSCH is decoded under the assumption that the PDSCH is transmitted by closed-loop multiplexing using a single layer.

In Table 1, transmission mode 10 represents a DL data channel transmission mode of the above-described CoMP transmission scheme. For example, if DCI format 2D is detected as a result of a UE blind-decoding the PDCCH, the PDSCH is decoded under the assumption that the PDSCH has been transmitted by a multi-antenna transmission scheme through antenna port 7 to antenna port 14, that is, based on demodulation RSs (DM-RSs). Alternatively, the UE decodes the PDSCH assuming that the PDSCH has been transmitted by a single-antenna transmission scheme based on DM-RS antenna port 7 or DM-RS antenna port 8.

On the other hand, if DCI format 1A is detected as a result of blind-decoding the PDCCH, a transmission mode differs according to whether an associated subframe is an MBSFN subframe. For example, the associated subframe is a non-MBSFN subframe, the UE decodes the PDSCH assuming that the PDSCH has been transmitted by a single-antenna transmission scheme based on CRS of antenna port 0 or by a CRS based transmit diversity scheme. If the associated subframe is an MBSFN subframe, the UE decodes the PDSCH assuming that the PDSCH has been transmitted by a single-antenna transmission scheme based on DM-RS of antenna port 7.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
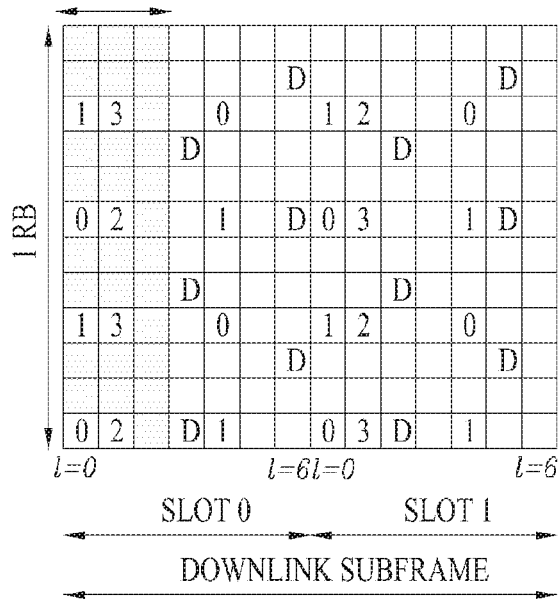
FIGS. 8 and 9 are diagrams illustrating DL RS configurations in an LTE system supporting DL transmission through four antennas.
Figure 9:
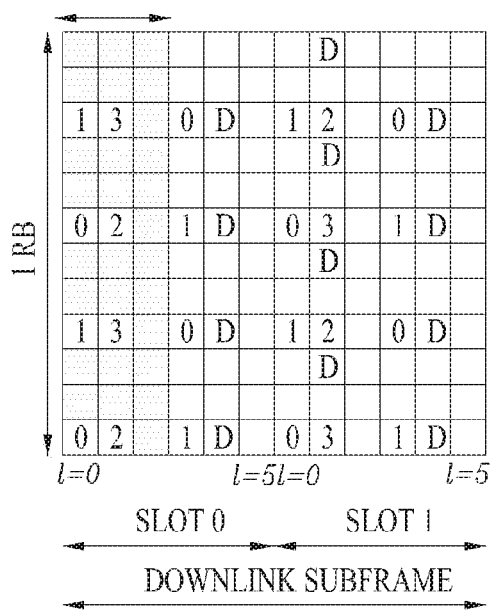

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
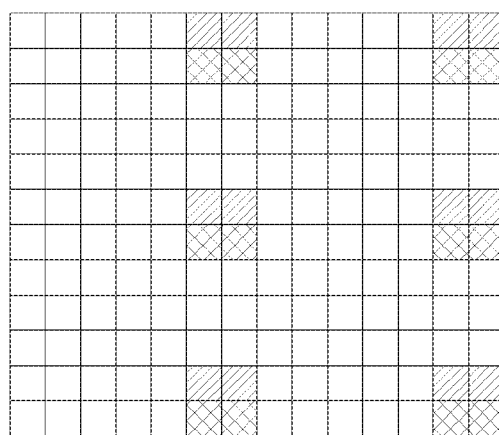
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared with CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 2 and Table 3 list CSI-RS configurations defined in the 3GPP standard. Specifically, Table 2 lists CSI-RS configurations in the case of a normal CP and Table 3 lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 | 18 | (9, 1) | 1 | (9, 1) | 1 | (9, 1) | 1 |
| only | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
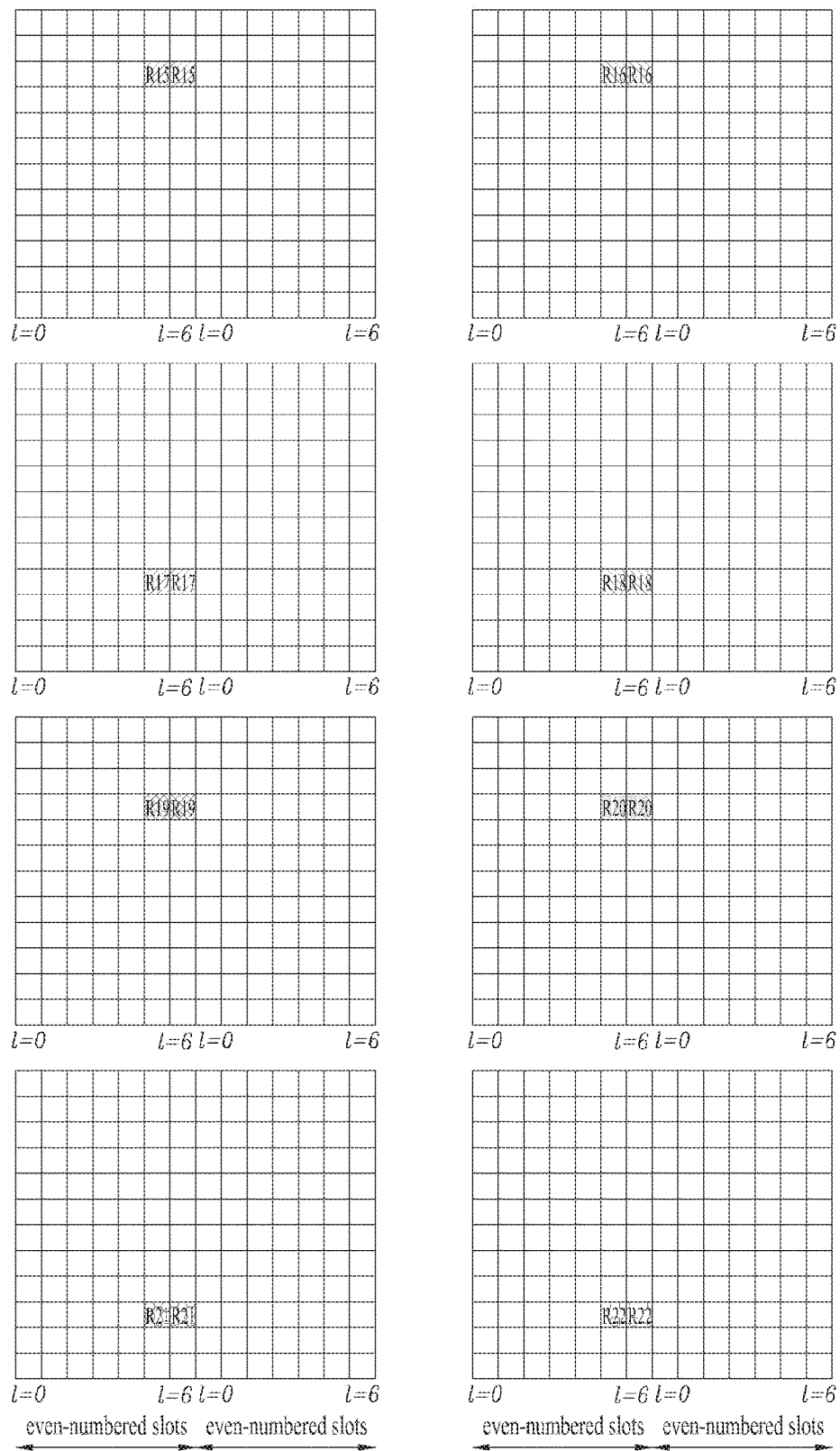
FIG. 11 illustrates CSI-RS configuration #0 of DL CSI-RS configurations defined in the current 3GPP standard.

In Table 2 and Table 3, (k',l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$, and a subframe offset $\Delta_{CSI-RS}$. Table 4 lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Meanwhile, information about a zero power (ZP) CSI-RS is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CS-RS transmission periodicity and subframe offset of a ZP CSI-RS by $I_{CSI-RS}$ illustrated in Table 4. zeroTxPowerResourceConfigList indicates a ZP CSI-RS configuration. The elements of this bitmap indicate the respective configurations included in the columns for four CSI-RS antenna ports in Table 2 or Table 3. A normal CSI-RS other than ZP CSI-RS is referred to as non zero-power (NZP) CSI-RS.

When the above-described CoMP scheme is applied, a plurality of CSI-RS configurations may be signaled to the UE through an RRC layer signal. The CSI-RS configurations are defined as listed in Table 5. Referring to Table 5, it may be appreciated that information about CRS capable of assuming quasi co-location (QCL) is included in each CSI-RS configuration.

TABLE 5

CSI-RS-ConfigNZP information elements

```
-- ASN1START
CSI-RS-ConfigNZP-r11 ::=         SEQUENCE {
    csi-RS-ConfigNZPId-r11           CSI-RS-ConfigNZPId-r11,
    antennaPortsCount-r11            ENUMERATED {an1, an2, an4, an8},
    resourceConfig-r11               INTEGER (0..31)
    subframeConfig-r11               INTEGER (0..154),
    scramblingIdentity-r11           INTEGER (0..503),
    qcl-CRS-Info-r11                 SEQUENCE {
        qcl-ScramblingIdentity-r11       INTEGER (0..503),
        crs-PortsCount-r11               ENUMERATED {n1, n2, n4, spare1},
        mbsfn-SubframeConfigList-r11     CHOICE {
            release                          NULL,
            setup                            SEQUENCE {
                subframeConfigList               MBSFN-SubframeConfigList
            }
        }                                                        OPTIONAL    -- Need ON
    }                                                            OPTIONAL,   -- Need OR
    ...
}
-- ASN1STOP
```

Now a description will be given of QCL between antenna ports.

If one antenna port is quasi co-located with another antenna port, this means that a UE may assume that the large-scale properties of a signal received from one antenna port (or a radio channel corresponding to the antenna port) are wholly or partially identical to those of a signal received from another antenna port (or a radio channel corresponding to the antenna port). The large-scale properties may include Doppler spread and Doppler shift which are associated with a frequency offset, average delay and delay spread which are associated with a timing offset, and average gain.

According to the definition of QCL, the UE may not assume that antenna ports that are not quasi co-located with each other have the same large-scale properties. Therefore, the UE should independently perform a tracking procedure in order to obtain the frequency offset and timing offset of each antenna port.

Meanwhile, the UE may perform the following operations regarding quasi co-located antenna ports.

1) The UE may identically apply estimated results of a power-delay profile of a radio channel corresponding to a specific antenna port, delay spread, Doppler spectrum, and Doppler spread to Wiener filter parameters used in channel estimation of a radio channel corresponding another antenna port.

2) The UE may acquire time synchronization and frequency synchronization of the specific antenna port and apply the same synchronization to another antenna port.

3) Finally, the UE may calculate the average of reference signal received power (RSRP) measurements of the quasi co-located antenna ports as an average gain.

For example, it is assumed that upon receipt of scheduling information of a DM-RS based DL data channel, e.g. DCI format 2C, through a PDCCH (or an enhanced PDCCH (E-PDCCH)), the UE performs channel estimation on a PDSCH using a DM-RS sequence indicated by the scheduling information and then demodulates data.

In this case, if a DM-RS antenna port for DL data channel demodulation is quasi co-located with a CRS antenna port of a serving cell, the UE may apply large-scale properties of a radio channel, which have been estimated from the CRS antenna port thereof, to channel estimation through the DM-RS antenna port, thereby improving the reception performance of the DM-RS based DL data channel.

Similarly, if the DM-RS antenna port for DL data channel demodulation is quasi co-located with the CSI-RS antenna port of the serving cell, the UE may apply large-scale properties of a radio channel, which have been estimated from the CSI-RS antenna port of the serving cell, to channel estimation through the DM-RS antenna port, thereby improving the reception performance of the DM-RS based DL data channel.

Meanwhile, in LTE, it is regulated that when a DL signal is transmitted in mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with large-scale properties except average gain. This means that physical channels and signals are transmitted in the same point. On the other hand, QCL type B is defined such that up to four QCL modes are configured for each UE by a higher-layer message to enable CoMP transmission such as DPS or JT and which QCL mode is used to receive a DL signal is dynamically configured through DCI.

DPS transmission in the case of QCL type B will now be described in more detail.

It is assumed that node #1 having $N_1$ antenna ports transmits CSI-RS resource #1 and node #2 having $N_2$ antenna ports transmits CSI-RS resource #2. In this case, CSI-RS resource #1 is included in QCL mode parameter set #1 and CSI-RS 10. resource #2 is included in QCL mode parameter set #2. Further, an eNB configures QCL mode parameter set #1 and CSI-RS resource #2 for a UE located within a common overage of node #1 and node #2 by a higher-layer signal.

Then, the eNB may perform DPS by configuring, using DCI, QCL mode parameter set #1 for the UE during data (i.e. a PDSCH) transmission to the UE through node #1 and configuring QCL mode parameter set #2 for the UE during data transmission to the UE through node #2. If QCL mode parameter set #1 is configured for the UE through the DCI, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An active antenna system (AAS) and three-dimensional beamforming will be described below.

In a legacy cellular system, an eNB reduces ICI and increases the throughput of UEs within a cell, e.g. SINRs, by mechanical tilting or electrical tilting, which will be described below in more detail.

Figure 12:
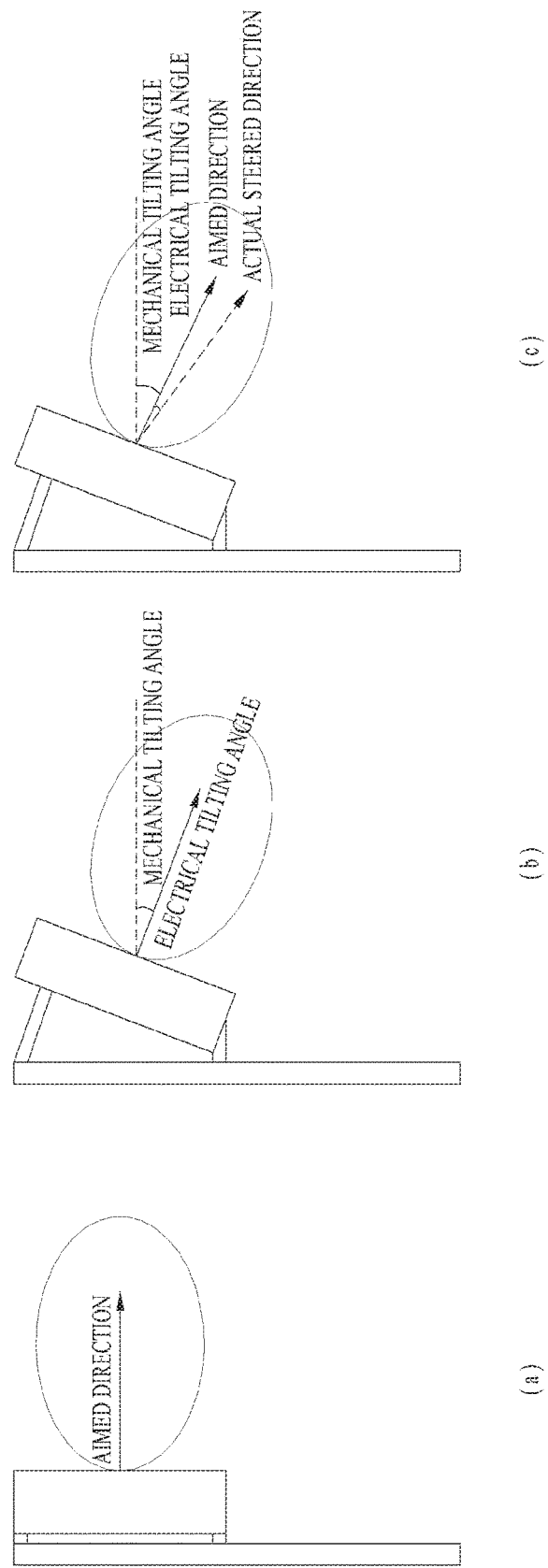
FIG. 12 is a diagram illustrating an antenna tilting scheme.

FIG. 12 is a diagram illustrating an antenna tilting scheme. Specifically, FIG. 12(a) illustrates an antenna structure to which antenna tilting is not applied, FIG. 12(b) illustrates an antenna structure to which mechanical tilting is applied, and FIG. 12(c) illustrates an antenna structure to which both mechanical tilting and electrical titling are applied.

In comparison with FIG. 12(a), mechanical tilting of FIG. 12(b) causes a beam direction to be fixed at initial antenna installation. Electrical tilting of FIG. 12(c) allows only very restrictive vertical beamforming due to cell-fixed tilting, despite the advantage of changing a tilting angle through an internal phase shift module.

Figure 13:
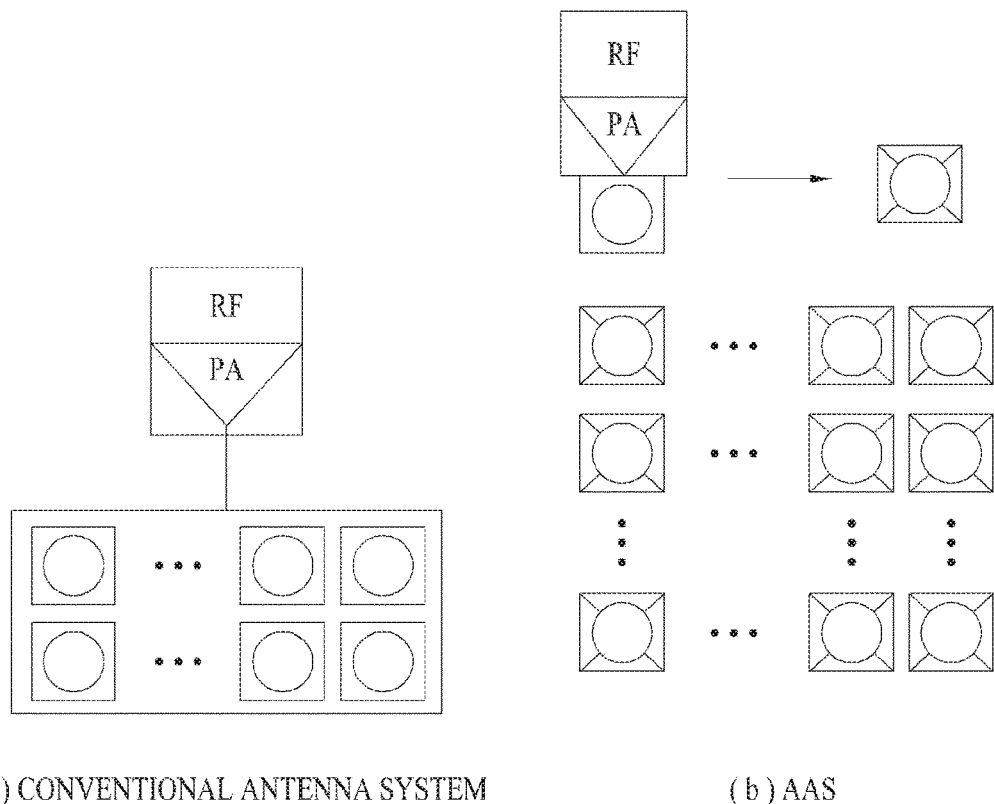
FIG. 13 is a diagram comparing a conventional antenna system with an active antenna system (AAS).

FIG. 13 is a diagram comparing a conventional antenna system with an AAS. Specifically, FIG. 13(a) illustrates the antenna system of the related art and FIG. 13(b) illustrates the AAS.

Referring to FIG. 13, as compared to the conventional antenna system, the AAS includes a plurality of antenna modules, each of which includes a radio frequency (RF) module such as a power amplifier (PA), that is, an active device so that the AAS can control the power and phase of each antenna module.

Generally, a linear array antenna, i.e. a one-dimensional array antenna, such as a ULA has been considered as a MIMO antenna structure. In a one-dimensional array structure, a beam that may be formed by beamforming exists on a two-dimensional (2D) plane. The same applies to a passive antenna system (PAS) based MIMO structure of a legacy eNB. Although a PAS based eNB has vertical antennas and horizontal antennas, the vertical antennas may not form a beam in a vertical direction and may allow only the aforedescribed mechanical tilting because the vertical antennas are in one RF module.

However, as the antenna structure of an eNB has evolved into an AAS, RF modules are independently configured even in vertical antennas. Consequently, vertical beamforming as well as horizontal beamforming is possible. This is called vertical beamforming or elevation beamforming.

The vertical beamforming may also be referred to as three-dimensional (3D) beamforming in that beams that can be generated according to the vertical beamforming may be formed in a 3D space in the vertical and horizontal directions. That is, the evolution of a one-dimensional array antenna structure to a 2D array antenna structure enables 3D beamforming. 3D beamforming is not necessarily formed when an antenna array is planar. Rather, 3D beamforming may be formed even in a ring-shaped 3D array structure. A feature of 3D beamforming lies in that a MIMO process is implemented on a 3D space in view of various antenna layouts other than existing one-dimensional antenna structures.

Figure 14:
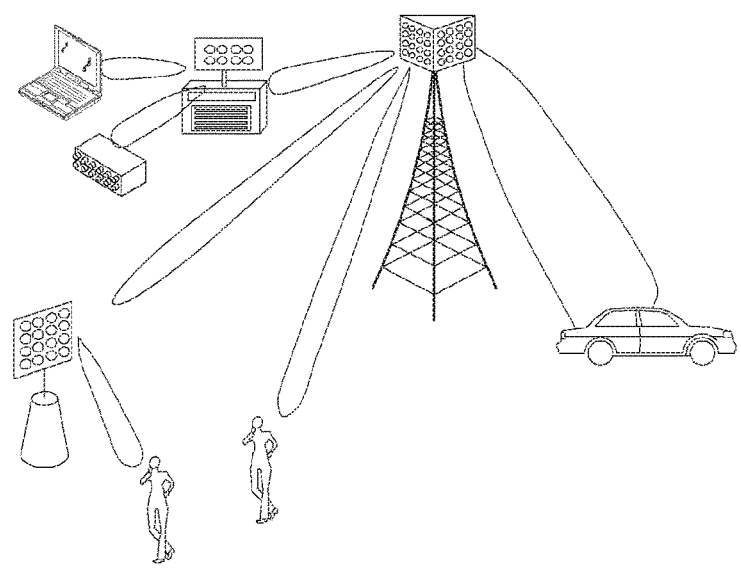
FIG. 14 illustrates exemplary UE-specific beamforming based on an AAS.

FIG. 14 illustrates exemplary UE-specific beamforming based on an AAS. Referring to FIG. 14, even though a UE moves forward or backward from an eNB as well as to the left and right of the eNB, a beam may be formed toward the UE by 3D beamforming. Therefore, a higher degree of freedom is given to UE-specific beamforming.

Further, as transmission environments using an AAS based 2D array antenna structure, not only an outdoor-to-outdoor environment where an outdoor eNB transmits a signal to an outdoor UE but also an outdoor-to-indoor (O2I) environment where an outdoor eNB transmits a signal to an indoor UE and an indoor hotspot where an indoor eNB transmits a signal to an indoor UE may be considered.

Figure 15:
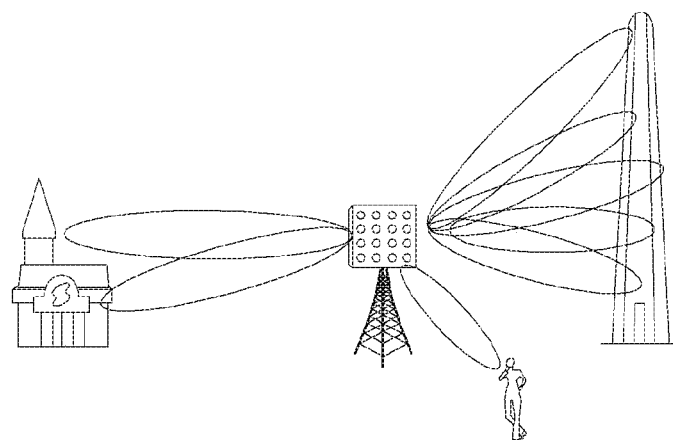
FIG. 15 illustrates an AAS based 3D beam transmission scenario.

FIG. 15 illustrates an AAS based 3D beam transmission scenario.

Referring to FIG. 15, an eNB needs to consider vertical beam steering based on various UE heights in relation to building heights as well as UE-specific horizontal beam steering in a real cell environment in which a plurality of buildings is present in a cell. Considering this cell environment, significantly different channel characteristics from those of an existing wireless channel environment, for example, shadowing/pathloss changes according to different heights, fading characteristic variations, etc. need to be reflected.

In other words, 3D beamforming is an evolution of beamforming in the horizontal direction only, based on an existing linear one-dimensional antenna array structure. 3D beamforming refers to a MIMO processing scheme performed by extending horizontal beamforming to elevation beamforming or vertical beamforming or combining horizontal beamforming with elevation beamforming or vertical beamforming, based on a multi-dimensional array antenna structure such as a planar array or on a massive antenna array.

The massive antenna array may have at least one of the following characteristics. That is, i) the massive antenna array is located on a 2D plane or a 3D space, ii) the massive antenna array includes 8 or more logical or physical antennas (the logical antennas may be expressed as antenna ports), and iii) each antenna of the massive antenna array may be configured by an AAS. However, the definition of the massive antenna array is not limited thereto.

<First Embodiment>

In a conventional MIMO system, PMI feedback for an entire antenna array of an eNB has been performed for closed-loop MIMO transmission. This may be understood that a UE feeds back a beam direction best preferred thereby among multiple beam directions capable of being generated by all antennas of the eNB expressed in the form of a PMI codebook.

Table 6 listed below shows comparison between beams transmitted through 16 antennas in the form of 4 rows by 4 columns and beams transmitted by 64 antennas in the form of 8 rows by 8 columns. Referring to Table 6, as the number of antennas of the eNB increases, the width of beams generated by eNB is reduced and the shape of the beams becomes sharp, thereby resulting in increase of beam gain. During closed-loop MIMO transmission, as a beam becomes sharper, a PMI at a timing measured by the UE and a PMI at a timing actually transmitted by an eNB are inconsistent, despite slight change in a channel. As a result, performance is significantly degraded. In other words, performance sensitivity for feedback may greatly increase.

TABLE 6

|  | 16 Tx Case | 64 Tx Case |
|---|---|---|
| Design frequency (GHz) | 2 | 2 |

TABLE 6-continued

|  | 16 Tx Case | 64 Tx Case |
|---|---|---|
| Array config | 4 × 4 | 8 × 8 |
| Antenna dimension (Half Length | 30 mm | 30 mm |
| elements distance | dx: 75 mm | dx: 75 mm |
|  | dy: 75 mm | dy: 75 mm |
| Fractional bandwidth (MHz) | 1.89 GHz~2.15 GHz (260 Mz) | 1.89 GHz~2.15 GHz (260 Mz) |
| VSWR | Max 2:1 | Max 2:1 |
| Radiation pattern shape | Directional | Directional |
| Max. gain (dB) | 19.52 | 25.54 |
| Radiation efficiency (%) | 100% | 100% |
| HPBW_E-plane (°) | 26 | 12 |
| HPBW_H-plane (°) | 24 | 12 |

Accordingly, the present invention proposes a method in which an eNB adaptively controls a beam shape (e.g. beam width, beam gain, beam direction, etc.) according to a channel situation with a UE in a system including a plurality of Tx antennas, and a feedback method of a UE for supporting the same.

First, when the eNB transmits a signal to the UE, it is proposed that the eNB adaptively select an effective Tx antenna port set suitable for a channel situation with each UE.

The effective Tx antenna port set is a subset of all Tx antenna port sets of the eNB, for performing data transmission to the UE and may be limited to a part of all antennas used for data transmission according to a channel situation with a UE.

Figure 16:
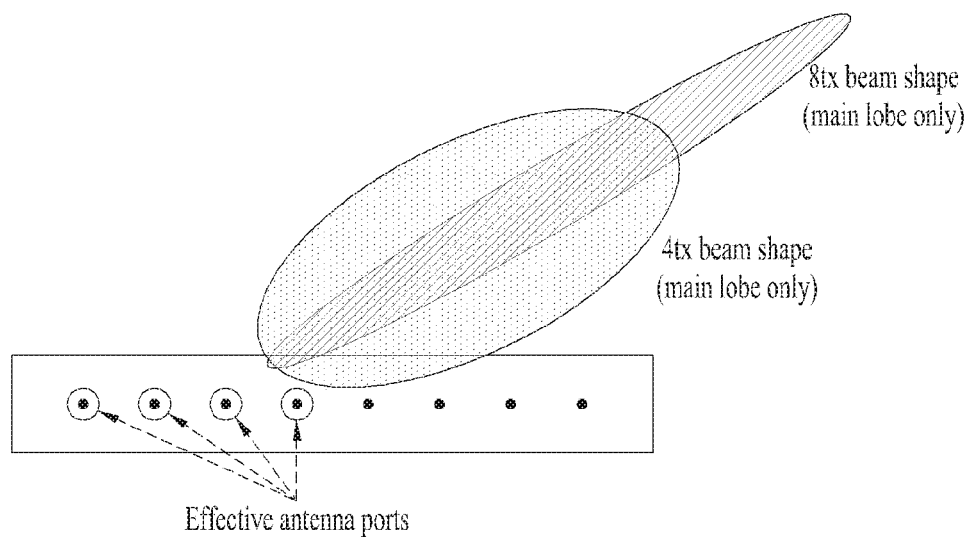
FIG. 16 illustrates exemplary selection of an effective antenna port set among all antenna ports according to a first embodiment of the present invention.

FIG. 16 illustrates exemplary selection of an effective antenna port set among all antenna ports according to a first embodiment of the present invention.

Referring to FIG. 16, in the case of an 8Tx ULA, since beams are relatively sharp, considerable gain can be obtained in an environment in which a UE moves a little, an ambient environment is static, and a line of sight (LoS) is ensured. However, if the UE moves a lot or there are many factors generating a dynamic change of a channel in the vicinity of the UE, a retransmission probability caused by a packet error increases relative to significant feedback overhead and beamforming gain may greatly decrease in a non-LoS (NLoS) environment even though retransmission does not occur.

Conventionally, an open-loop MIMO technique has been applied to the UE in such an environment. However, since the open-loop MIMO technique cannot obtain beam gain, performance degradation increases relative to closed-loop MIMO as the number of antennas increases. Therefore, the present invention proposes a method for transmitting a beam formed by extending beam width even though beam gain decreases, as illustrated in FIG. 16, when it is expected that the eNB cannot obtain beamforming gain of a given level in a channel environment of the UE. That is, an example of decreasing the number of effective antenna ports and the size of an effective antenna array is illustrated in FIG. 16 in order to extend beam width.

Effective antenna ports, that is, an effective antenna array, are not always configured to be adjacent as in FIG. 16.

Figure 17:
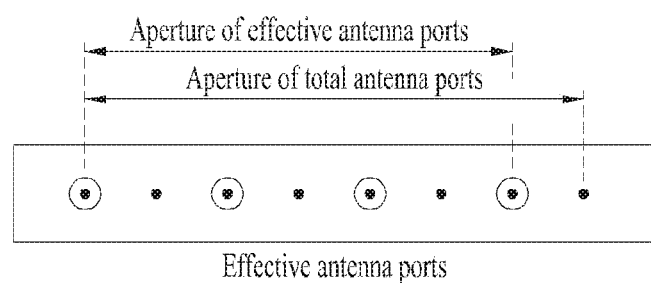
FIG. 17 illustrates another exemplary selection of an effective antenna port set among all antenna ports according to the first embodiment of the present invention.

FIG. 17 illustrates another exemplary selection of an effective antenna port set among all antenna ports according to the first embodiment of the present invention. If it is assumed that a UE can perform spatial multiplexing of rank 2 or more due to an NLoS environment and simultaneously a high SINR because the UE is adjacent to an NB, the number of effective antennas can be decreased while the size of an entire effective array is not greatly decreased in consideration of performance relative to feedback overhead, as illustrated in FIG. 17.

As a similar embodiment, when two adjacent antennas are jointly mapped to one logical antenna, the number of effective antennas (or the number of logical antennas) can be reduced to half the number of all antennas while the size of an entire effective antenna array is similarly maintained.

When the present invention is applied to a 2D antenna array, although an effective antenna port set of all antennas may be simultaneously determined, the number effective antennas and/or the size of an effective antenna array may be controlled with respect to each of a vertical region and a horizontal region. In other words, an effective antenna port set of the vertical region and an effective antenna port set of the horizontal region may be separately determined. Here, the range of physical signals/channels to which the effective Tx antenna port set of the present invention is applied may be limited to UE-specific signals/channels such as a DM-RS (UE-specific RS) and a PDSCH in an LTE system.

According to the present invention, in forming a UE-specific beam, a packet error probability can be lowered by transmitting a beam, the sharpness of which is reduced, to a UE that is expected to have a severe channel error or a UE to which data retransmission is needed (fallback mode) and feedback overhead can be reduced or feedback accuracy can be increased with respect to a UE in an environment in which a channel error is expected to be serious and a UE having a low SINR.

Meanwhile, according to the present invention, a channel situation of the UE may be divided into three or more categories to determine a transmission mode. For example, the transmission mode may be defined below using an effective antenna port set, that is, a partial antenna array.

Category 1 (low mobility, LoS, and static environment)
→Dedicated beamforming with all antennas Category 2 (mid mobility, weak LoS, and non-static environment)→Dedicated beamforming with a subset of antennas Category 3 (high mobility, NLoS, and dynamic environment)→open-loop beamforming Meanwhile, during beamforming using a partial antenna array, an effective Tx antenna port set may be determined by at least of channel characteristics of an eNB and a UE, for example, mobility of the UE (speed, rotation, acceleration, etc.), a Doppler level of a channel (Doppler spread, maximum Doppler value, etc.), a scattering environment around the UE (number and distribution of scatterers, mobility of scatterers, etc.), characteristic parameters of a channel matrix (rank, Eigen value, condition number, etc.), an LoS/NLoS factor (LoS gain-to NLoS gain ratio, number of NLoS clusters, etc.), and an SINR. Some of the above information may be obtained from a radio environment database according to location of the UE in eNB coverage or may be directly measured using UL signal by the eNB. Alternatively, the UE may provide some of the above information.

Alternatively, during beamforming using the partial antenna array, the UE may provide the eNB with at least one of mobility of the UE (speed, rotation, acceleration, etc.), a Doppler level of a channel (Doppler spread, maximum Doppler value, etc.), a scattering environment around the UE (number and distribution of scatterers, mobility of scatterers, etc.), characteristic parameters of a channel matrix (rank, Eigen value, condition number, etc.), an LoS/NLoS factor (LoS gain-to NLoS gain ratio, number of NLoS clusters, etc.), and an SINR. To this end, the UE may configure feedback information using various sensors such as a location sensor, an acceleration sensor, etc.

Now, a description will be given of a beamforming method using a partial antenna array based on feedback information of the UE First, the UE may feed back a preferred effective Tx antenna port set to the eNB. To this end, the UE judges which Tx antenna ports among all Tx antenna ports of the eNB are to be selected as an effective antenna port set and feeds back information about the selected effective antenna port set. Similarly, the UE selects an optimal effective antenna set using available information among UE mobility, a Doppler level, a scattering environment around the UE, LoS/NLoS, an SINR, etc.

The information fed back by the UE may be variously configured as follows.

a) The information about the effective Tx antenna port set may be configured by at least one of a set of antenna port indexes (or an index of an antenna port set), a pilot pattern index, and the number of antenna ports.

For example, if the information about the effective Tx antenna port set is configured by the number of antenna ports and the index of an antenna port set and if the eNB includes a total of 8 Tx antennas, the UE selects the preferred number of antennas from among 2 Tx, 4 Tx, and 8 Tx antennas, selects an index corresponding to the number of antennas from Table 7 shown below, and feeds back the selected index corresponding to the number of antennas together with the number of antennas.

TABLE 7

| Index | 2Tx | 4Tx |
|---|---|---|
| 0 | Port {0, 1} | Port {0, 1, 2, 3} |
| 1 | Port {0, 7} | Port {0, 2, 4, 6} |

<Second Embodiment>

In the second embodiment of the present invention, a beamforming scheme using a partial antenna array is applied to each of vertical beamforming and horizontal beamforming in a 3D beamforming scheme. In the 3D beamforming scheme, as the number of antennas increases, pilot and feedback overhead increases and it is difficult to cover, using a single pilot pattern, pilot signals transmitted through all eNB antennas. To solve such problems, an eNB may transmit pilot signals using a plurality of pilot patterns to a UE.

Figure 18:
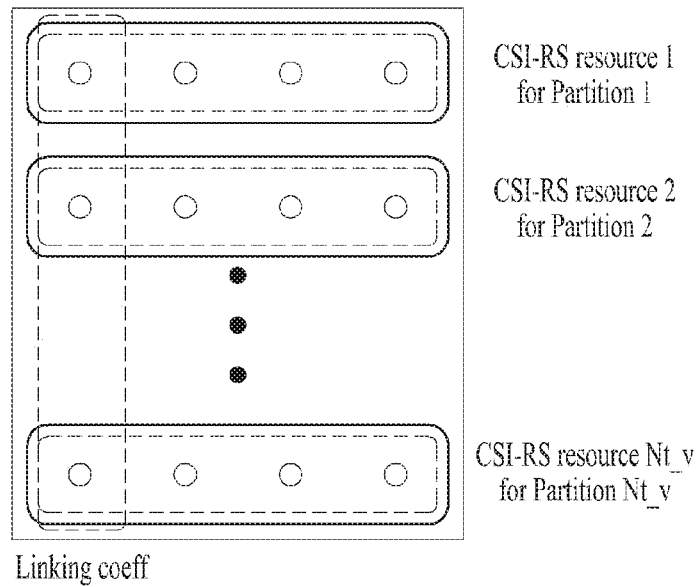
FIGS. 18 and 19 illustrate exemplary pilot transmission using a plurality of pilot patterns.
Figure 19:
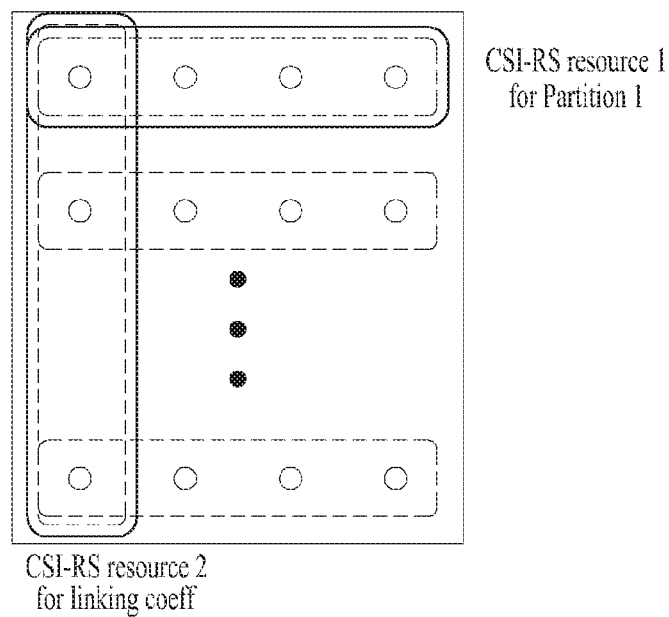

FIGS. 18 and 19 illustrate exemplary pilot transmission using a plurality of pilot patterns. Particularly, FIG. 18 illustrates exemplary pilot patterns configured in a horizontal direction, in which antennas are grouped in the horizontal direction and one CSI-RS resource is allocated to each antenna group. In this case, a precoder associated with each pilot pattern (i.e. a CSI-RS resource) corresponds to a precoder performing horizontal beamforming. A precoder linking each pilot pattern, more specifically, a set of coefficients indicating the difference in phase and size between the pilot patterns, corresponds to a precoder performing vertical beamforming. It is apparent that the antennas may be grouped in a vertical direction and the pilot patterns may be allocated to each antenna group.

FIG. 19 illustrates exemplary pilot patterns configured in both a horizontal direction and a vertical direction in which a precoder of the vertical direction is configured using pilot patterns other than a set of coefficients indicating the difference in phase and size between pilot patterns.

In this case, the following is proposed in order to perform beamforming using an independent partial antenna array with respect to each of the horizontal direction and vertical direction.

A) After receiving a plurality of QCL pilot patterns, a UE feeds back, to an eNB, (1) the number and/or indexes of antenna ports to be included in preferred QCL pilot patterns and (2) the number and/or indexes of coefficients for linking preferred QCL pilot patterns. The QCL pilot patterns refer to a set of pilot patterns transmitted from the same transmission point and may be defined as time-/frequency-synchronized pilot patterns in terms of a receiver. Characteristically, the QCL pilot patterns may include the same number of antenna ports. The pilot patterns may be NZP CSI-RS resources or CSI-RS processes.

The above information (1), i.e. the number and/or indexes of antenna ports to be included in preferred QCL pilot patterns, may be independent information of the respective QCL patterns but may be expressed as one representative value capable of being commonly applied to all QCL pilot patterns.

In the above information (2), i.e. the number and/or indexes of coefficients for linking preferred QCL pilot patterns, the coefficients for linking QCL pilot patterns may be coefficient values indicating the difference in phase and/or size between specific antenna ports of the pilot patterns. The UE may gather corresponding coefficient values and feed back the coefficient values to the eNB.

For example, in FIG. 18, the UE may calculate the difference in size and phase between first antenna ports of respective CSI-RS resources and feed back the calculated difference values to the eNB. These values may be used for vertical beamforming in terms of the eNB. To use a whole vertical antenna array, as many coefficient values (hereinafter, linking coefficients) as the total number (N) of QCL pilot patterns are needed. However, since the phase and/or size difference value can be measured based on a specific pilot pattern and thus information about the reference pilot pattern may not be needed, (N−1) coefficient values may be required. For example, when two pilot patterns are transmitted, only one linking coefficient of the second pilot pattern with respect to the first pilot pattern may be required. This will be described in more detail.

Figure 20:
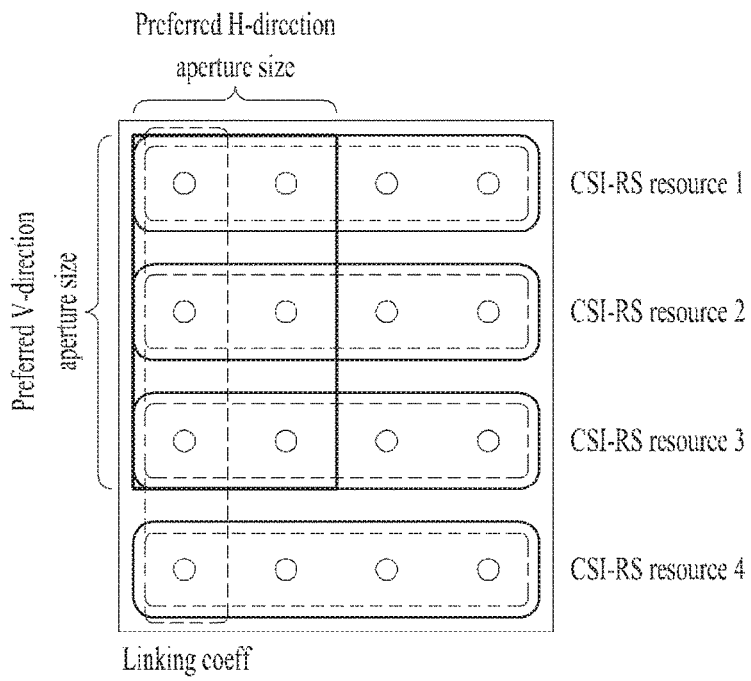
FIG. 20 illustrates exemplary beamforming using a partial antenna array according to a second embodiment of the present invention.

FIG. 20 illustrates exemplary beamforming using a partial antenna array according to a second embodiment of the present invention. Particularly, a 2D antenna array environment in which 16 (=4×4) antenna ports are transmitted is assumed in FIG. 20.

Referring to FIG. 20, an eNB configures and transmits four QCL CSI-RS resources, that is, CSI-RS resource 1 to CSI-RS resource 4 to a UE. If the UE prefers beam width corresponding to two antenna ports in a horizontal direction and beam width corresponding to three antenna ports in a vertical direction, the UE may feed back the following information. Here, a system for feeding back up to (N-1) linking coefficients is assumed.

Preferred number of antenna ports for each QCL CSI-RS resource=2
Preferred number of linking coefficients=2

In the above example, although information about only the number of antenna ports and the number of linking coefficients is expressed, information about antenna indexes may also be fed back so that a preferred antenna subarray is not concentrated to a specific part. For example, if the UE prefers antenna ports #2 and #3 among antenna ports #0 to #3 included in a CSI-RS pattern, the indexes of the preferred antenna ports may be expressed in a set form as shown below and or a start index of the preferred antenna ports may be fed back together with the number of preferred antenna ports.

Preferred antenna port index set: {#2, #3}
Preferred antenna port start index (#2)+number of antenna ports (2)

The index information is applicable to the linking coefficients in the same form.

Along with the proposed information, the UE may feed back the linking coefficients and precoder information such as a preferred PMI, based on the feedback information. That is, the UE may transmit a PMI selected from a 2Tx PMI codebook rather than 4Tx PMI codebook with respect to each CSI-RS resource and feed back only linking coefficients for linking three among four CSI-RS resources. Other CSI feedback information such as CQI and RI may be calculated based on the above feedback information. The transmission periods of the proposed information and the CSI feedback information may differ.

If pilot patterns are applied to both the horizontal direction and the vertical direction as illustrated in FIG. 19, the UE may feed back the preferred number of antenna ports of each pilot pattern and index information about the preferred antenna ports and perform beamforming using an independent partial antenna array with respect to the horizontal and vertical directions.

If the feedback information proposed in the present invention is applied to a wideband system, a separate feedback information set with respect to each frequency region divided according to, for example, a subband; sub-carrier, resource block, etc. may be fed back. Alternatively, the feedback information only for a specific frequency region selected by the UE or designated by the eNB may be transmitted. The frequency region may be configured by one or more continuous frequency regions or discontinuous frequency regions.

<Third Embodiment>

Meanwhile, one object of partial antenna array based beamforming is to form beams having an optimal beam width according to a channel environment and characteristic such as mobility of the UE. Considering that the most decisive element for determining the beam width is the size of an effective antenna array, partial antenna array based beamforming is a technique for adaptively forming the size of effective antenna array according to a channel situation of the UE.

The UE may determine the size of an effective antenna array suitable therefor using a channel statistical characteristic of Doppler, LoS, etc. or using mobile speed measured through a sensor therein. Consequently, although the size of the effective antenna array is an important factor for the UE, a detailed position of a partial antenna array may not be important.

For example, when four antennas are present, it is assumed that a preferred beam width is identical to a beam width generated by two adjacent antennas. The performance of the UE may not be greatly affected by any one of antenna sets {0,1}, {1,2}, and {2,3} used by the eNB upon transmitting data to the UE. Accordingly, in terms of the UE, the preferred number of antenna ports or the size of the effective antenna array is an important element.

On the other hand, since the eNB needs to simultaneously transmit data in the form of any one of code division multiple access (CDMA)/frequency division multiple access (FDMA)/time division multiple access (TDMA)/spatial division multiple access (SDMA) to multiple UEs, balance of transmit powers of eNB antennas should be kept. That is, antenna sets for transmitting signals to UEs should be dispersed if necessary so as not to overlap each other.

For example, when four antennas are present, if the size of effective antenna array preferred by UE A is 2 and the size of effective antenna array preferred by user B is also 2, data transmission using an antenna set {0,1} to UE A and data transmission using an antenna set {2,3} to UE B are the most efficient method considering balance of transmit powers for the antennas.

For such a power balance per antenna, the third embodiment of the present invention proposes that the eNB provide antenna port shuffling information to the UE. The UE may perform, using the shuffling information, at least one of feedback of information about the number of antenna ports or the size of effective antenna array and feedback of CSI. The feedback of the CSI may include not only feedback of implicit information such as PMI, CQI, and RI but also feedback of explicit information such as a covariance matrix, a channel coefficient, and a MIMO channel matrix.

The antenna port shuffling information is information indicating an antenna set which is referred to when the UE determines the number of antennas or performs CSI feedback. Different shuffling information may be signaled per UE.

In the present invention, it is desirable that the eNB support UEs using different antenna sets by mapping antenna ports in a different order per UE. For example, when a set of antennas is {0,1,2,3}, different shuffling information may be designated such that the antennas are mapped to UE A in order of {0,1,2,3} and to UE B in order of {2,3,1,0}. In this case, if UE A and UE B desire to perform transmission using two antennas, the eNB may allocate an antenna set {0,1} to UE A and an antenna set {2,3} to UE B.

Accordingly, the proposed antenna port shuffling information may include 1) antenna port index shifting value, 2) reverse antenna port index ON/OFF, and 3) antenna port index permutation value or may be configured by a combination of the above 1), 2), and 3). This will be described in more detail.

1) Antenna Port Index Shifting Value

Assuming that the eNB transmits 4Tx CSI-RS resources (antenna port indexes 15, 16, 17, and 18) to UEs in a cell, the eNB configures an antenna port index shifting value as one of integers 0 to 3 with respect to each of the UEs in the cell. Each UE cyclic-shifts the antenna port indexes by the index shifting value. For example, if the antenna port index shifting value is 2, the eNB rearranges the antenna port indexes in order of {17, 18, 15, 16} and determines the number of antenna ports or the size of an effective antenna array, based on the rearranged order. More specifically, if the antenna port index shifting value is 2, port indexes corresponding to one to three antenna ports may be mapped as follows.

1Tx case=port {17} only
2Tx case=port {17, 18}
3Tx case=port {17, 18, 15}

In the above example, in order to prevent non-contiguity of antenna port indexes as in the 3Tx case, a method other than cyclic shifting may be used when the antenna port index shifting value is applied. For example, after a shifting value is applied once, if an antenna port index reaches a maximum value, a rule for sequentially including indexes starting from an index nearest to antenna port indexes of a combined set may be configured. That is, when the antenna port index shifting value is 2, port indexes corresponding to one to three antenna ports allocated to the UE are mapped as follows.

1Tx case=port {17} only
2Tx case=port {17, 18}
3Tx case=port {17, 18, 16}

Especially, in the 3Tx case, since an index nearest to an index set {17, 18} is 16, it may be appreciated that antenna port index 16 is included in the configured antenna port set.

This may be expressed by an algorithm as shown in Table 8.

TABLE 8 j=1
For i=I_ini to I_max,
If i+S≤I_max
$P_i$ = i+S
Else
$P_i$ = I_ini +S−j
j=j+1
End In Table 8, I_ini is a minimum antenna port index and may correspond to antenna port index 15 in the above example and I_max is a maximum antenna port index and may correspond to antenna port index 18 in the above example. S denotes an antenna port index shifting value and is 2 in the above example. As a result of the algorithm of Table 8, Pi (an index of an i-th antenna port included in a set) is derived.

2. Reverse Antenna Port Index On/Off

The antenna port index shifting value indicates a start point of an antenna port index per UE, whereas reverse antenna port index ON/OFF information indicates a direction in which the antenna port index is read. For example, if a reverse antenna port index is an ON state, the antenna port index is read in reverse.

A UE, the reverse antenna port index of which is ON in 4Tx CSI-RS resources, reads antenna port indexes in the reverse, that is, in order of {18, 17, 16, 15}. This information may be used alone but may be used together with the antenna port index shifting value to simultaneously designate the start point and direction of the antenna port indexes.

3. Antenna Port Index Permutation Value

An antenna port index permutation value is information directly indicating permutation information used when antenna port indexes are re-ordered. For example, a plurality of applicable permutation rules may be defined. Then, an index indicating a corresponding permutation rule may be signaled or index permutation may be signaled in the form of one-line notation, two-line notation, or cyclic notation. Alternatively, a permutation matrix index may be signaled in the form of a permutation matrix.

While the example for determining the number of antennas using the antenna shuffling information has been described, the antenna shuffling information may be used even in a process for performing CSI feedback after determining the number of antennas. For example, when the UE determines 2Tx PMIs by the antenna shuffling information upon receiving 4Tx CSI-RS resources, PMIs may be regulated to be selected from a 2Tx PMI codebook based on an antenna port {17,18} rather than antenna port {15,16}.

Although the eNB may signal the antenna shuffling information to the UE, antenna shuffling may be performed by a rule determined by a network. For example, an antenna shuffling rule to be used may be determined by an identifier of the UE. Alternatively, the antenna shuffling rule may be randomly selected per UE.

Hereinafter, examples of eNB-to-UE signaling will be described when antenna shuffling is applied.

A) The eNB transmits antenna shuffling information and a pilot signal to the UE and the UE feeds back the preferred number of antenna ports and CSI based on the preferred number of antenna ports to the eNB.

B) Alternatively, the eNB transmits a pilot signal to the UE and the UE feeds back the preferred number of antenna ports to the eNB. Next, the eNB signals antenna shuffling information based on the preferred number of antenna ports to the UE and the UE feeds back CSI based on the preferred number of antenna port and the shuffling information to the eNB.

C) Alternatively, the eNB transmits first antenna shuffling information and a pilot signal to the UE and the UE, that has received the first antenna shuffling information and the pilot signal, transmits the preferred number of antenna ports. The eNB signals second antenna shuffling information based on the preferred number of antenna ports to the UE and the UE feeds back CSI based on the signaled second antenna shuffling information to the eNB.

The following D) and E) are examples in which the eNB determines and designates the number of antennas to be applied to each UE.

D) The eNB signals, to the UE, a pilot signal and simultaneously signals the number of antenna ports and antenna shuffling information applied to the corresponding UE. The UE calculates CSI using the number of antenna ports and antenna shuffling information and feeds back the CSI.

E) Alternatively, the UE transmits mobility information thereof and statistical information of a channel (e.g. LoS, Doppler, etc.) to the eNB and the eNB, that has received the mobility information and statistical information, transmits a pilot signal to the UE and signals the number of antenna port and antenna shuffling information applied to the corresponding UE. The UE calculates CSI based on the pilot signal, the number of antenna ports, and the antenna shuffling information and feeds back the CSI.

Meanwhile, if the present invention is applied to a 3D beamforming environment, the antenna shuffling information may be provided with respect to both a vertical direction and a horizontal direction of a 2D antenna array. In addition, if a plurality of patterns is configured in any one of the vertical direction and the horizontal direction, the antenna shuffling information may be configured in the form of pilot pattern shuffling information for calculation/reporting of antenna port shuffling information and linking coefficients in the pilot patterns. The linking coefficients denote coefficient values indicating the difference in phase and/or size between specific antenna ports of the configured pilot patterns.

That is, when a plurality of QCL pilot patterns is allocated to the UE, the antenna port shuffling information may include shuffling information of antenna ports belonging to the pilot patterns and/or shuffling information of the pilot patterns.

The plural QCL pilot patterns indicate a set of pilot patterns transmitted in the same transmission point and may include the same number of antenna ports. The pilot patterns may be NZP CSI-RS resources or CSI-RS processes in an LTE system.

The shuffling information of antenna ports may be independent information per pilot pattern or may be a single piece of information commonly applied to all QCL pilot patterns. If the pilot patterns are configured with respect to both the vertical direction and the horizontal direction, the antenna shuffling information may be expressed only by antenna port shuffling information in the pilot patterns.

<Fourth Embodiment>

Figure 21:
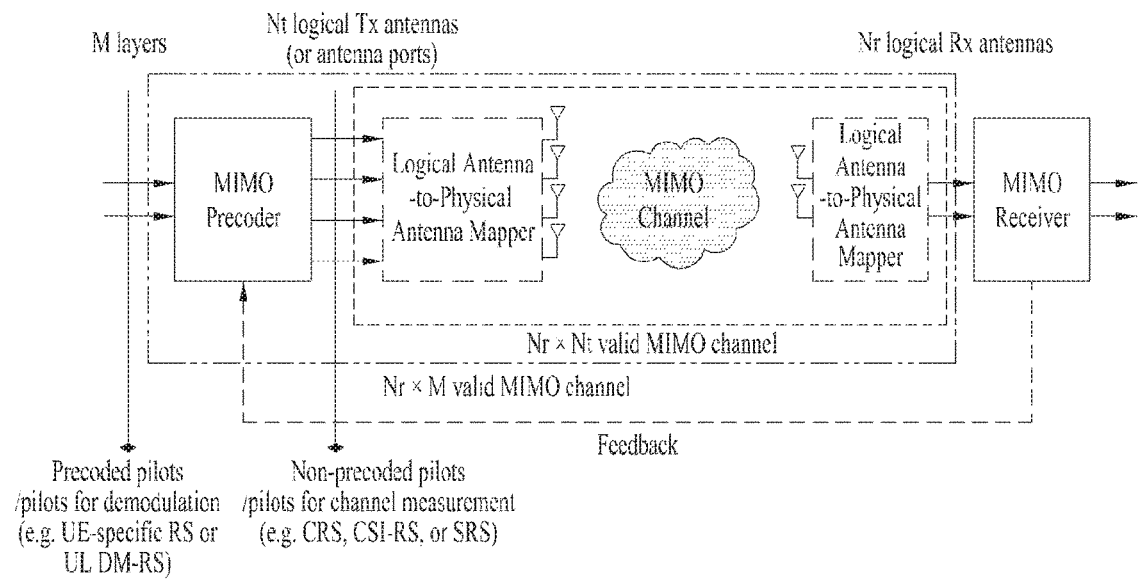
FIG. 21 illustrates a general precoding structure of a MIMO system.

FIG. 21 illustrates a general precoding structure of a MIMO system.

Referring to FIG. 21, M spatial data streams (or layers) are mapped to Nt Tx antenna ports or Nt logical Tx antennas by a MIMO precoder, where M denotes transmission rank. Obviously, the logical antennas may not be mapped to actual physical antennas in one-to-one correspondence. For instance, if a large scale antenna array can be installed in an eNB, a plurality of physical antennas may be mapped to one logical antenna. Generally, such a logical antenna-to-physical antenna mapping relationship is not defined in communication specification standard. At a receiver, a logical Rx antenna-to-physical Rx antenna mapping relationship is configured in a similar way and streams passing through antennas are transmitted to a MIMO receiver. In a broadband system, a frequency modulation related block or module such as a subcarrier mapper/demapper may be added before or after the MIMO precoder/receiver.

Pilot signals supported in LTE may be broadly categorized into precoded pilot signals and non-precoded pilot signals according to whether MIMO precoding is applied. The non-precoded pilot signals are mainly used for channel estimation and include a CRS and a CSI-RS on DL and an SRS on UL. The precoded pilot signals are transmitted after passing through the MIMO precoder and are mainly used for transmission stream demodulation of the receiver. The precoded pilot signals include a UE-specific RS and an E-PDCCH DM-RS on DL, and a DM-RS on UL.

Each pilot signal may use a different logical antenna-to-physical antenna mapper according to type thereof. As an example, up to 8 (=Nt) Tx antennas are supported with respect to the CSI-RS, whereas only up to 4 (=Nt) Tx antennas are supported with respect to the CRS which is the same DL pilot signal as the CSR-RS.

When the precoded-pilot signals are used, the receiver may estimate an Nr×M MIMO channel matrix by measuring signals which are received at Nr Rx logical antennas from M layers. On the other hand, when the non-precoded pilot signals are used, the receiver may estimate Nr×Nt MIMO by measuring signals which are received at Nr Rx logical antennas from Nt Tx logical antennas. If pilot signals are transmitted through partial frequency resources in a broadband system, an Nr×M or Nr×Nt MIMO channel matrix for an associated frequency resource region may be estimated.

Information about the Nr×Nt channel matrix measured by the receiver from pilot signals for channel estimation is fed back to the transmitter, thereby aiding in determining a MIMO precoder used when the transmitter transmits data. Such feedback information includes, for example, an RI indicating information about the preferred number (M) of layers, a PMI indicating information about a preferred Nt×M MIMO precoder, and a covariance matrix indicating statistical characteristic information of an Nr×Nt channel.

Figure 22:
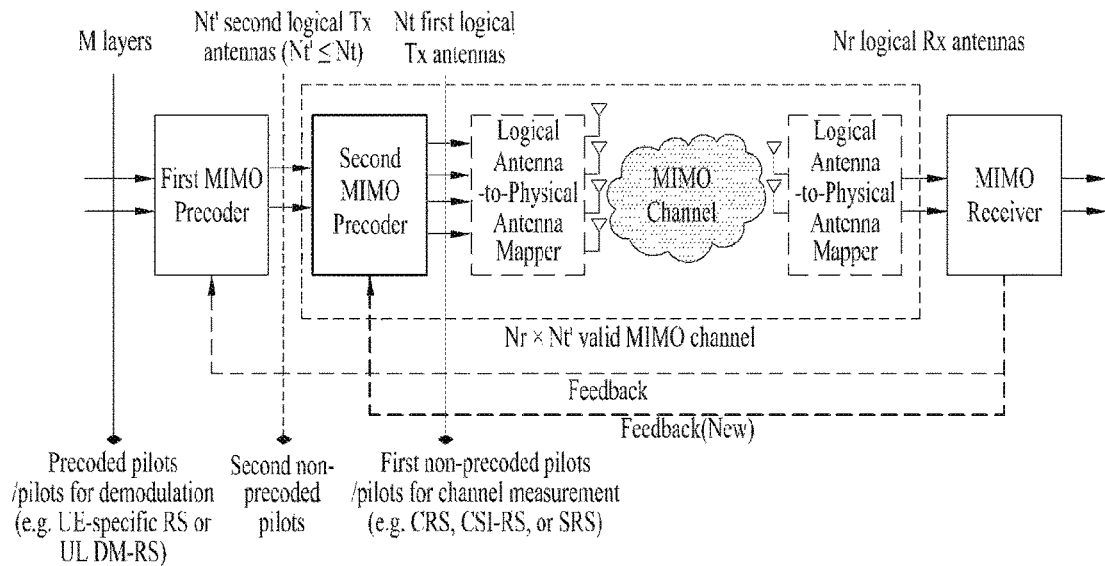
FIG. 22 illustrates a precoding structure according to a fourth embodiment of the present invention.

FIG. 22 illustrates a precoding structure according to a fourth embodiment of the present invention.

The precoding structure in FIG. 22 is illustrated in view of the receiver. In terms of the transmitter, the transmitter may be extended to a structure in which streams are transmitted to a plurality of receivers through respective MIMO precoders in consideration of multi-user MIMO transmission.

Meanwhile, if the number of Tx antennas increases as in a next-generation antenna system represented by the above-described massive MIMO and, thus, if the number of Tx logical antennas, Nt, is much larger than that in a conventional system, the number of channels that the receiver should estimate correspondingly increases and channel estimation becomes complicated. Such complexity may more seriously increase when the number of Rx antennas, Nr, increases. Since the number of Tx logical antennas, Nt, and the number of pilot signals for channel estimation are proportional to each other, pilot overhead needs to increase in order to maintain channel estimation performance of the same level. Furthermore, feedback overhead increases geometrically and/or feedback accuracy decreases according to increase in the number of Tx logical antennas. Consequently, as the number of Tx logical antennas increases, problems such as increase in pilot overhead, increase in feedback overhead, reduction in feedback accuracy, increase in channel estimation complexity/error, etc.

To solve the problems of increased pilot/feedback overhead and complexity according to increase in the number of Tx logical antennas, the present invention proposes configurations of a first MIMO precoder for mapping M layers to Nt' second logical antennas and a second MIMO precoder for mapping the Nt' second logical antennas to Nt (where Nt'≤Nt) first logical antennas. The configuration of the second logical antennas is adaptively determined according to a channel characteristic between a transmitter and a receiver.

The second MIMO precoder serves to define a relationship between the first logical antennas and the second logical antennas which are equal to or less than the first logical antennas in number As an embodiment of the second MIMO precoder, when Nt'=2 and Nt=4, an Nt×Nt' matrix may be used as the second MIMO precoder.

[Equation 11]

$$D_1 = \sqrt{\rho_1}\begin{bmatrix} 1 & 0 & 0 & 0 \\ 0 & 1 & 0 & 0 \end{bmatrix} \text{(Antenna selection type)},$$

$$D_2 = \sqrt{\rho_2/2}\begin{bmatrix} 1 & 1 & 0 & 0 \\ 0 & 0 & 1 & 1 \end{bmatrix} \text{(Partial antenna combining Type)},$$

In the above embodiment, $\rho_1$ and $\rho_2$ are power scaling factors and values thereof may be determined depending upon whether power caused by the second MIMO precoder is decreased/increased/maintained.

As described above, the number of logical antennas determines the number of pilot signals for channel measurement in terms of the transmitter and determines the size of an effective MIMO channel for a CSI feedback configuration in terms of the receiver. In an existing system, the logical antennas are simplified for non-precoded pilot signal transmission and CSI feedback based on the non-precoded pilot signal transmission. That is, the following relationship has been satisfied: the number logical antennas=the number of transmission pilot signals of the transmitter=the number of Tx antennas in an effective MIMO channel referred to during a CSI feedback configuration of the receiver.

The present proposal defines new logical antennas, that is, second logical antennas. The proposed logical antennas may be used to reduce transmission pilot overhead in terms of the transmitter and may be used to reduce feedback overhead or raise feedback accuracy in terms of the receiver by reducing the dimensions of the effective MIMO channel referred to during the CSI feedback configuration. In this case, the number of the second logical antennas may not be equal to the number of transmission pilot signals of the transmitter according to whether a second non-precoded pilot signal is introduced and may not be equal to the number of Tx antennas in the effective MIMO channel referred to during CSI feedback configuration of the receiver according to whether CSI feedback based on the reduced dimensions of the channel is introduced. That is, the proposed logical antennas may have an effect on only one of a transmission pilot of the transmitter and a feedback channel configuration of the receiver.

The present invention is advantageous in that the number of logical antennas can be adaptively changed according to the state of the transmitter, receiver, or network. Generally, a first non-precoded pilot is determined irrespective of the receiver. When DL is considered, the first non-precoded pilot is received by all receivers (i.e. UEs) within coverage of a corresponding transmitter (i.e. eNB). For example, in the LTE system, a CRS or a CSI-RS corresponding to the first non-precoded pilot is commonly received by UEs in coverage of a corresponding eNB and is used for cell selection and handover as well as CSI feedback. Since the configuration of the first non-precoded pilot on UL is also determined according to the characteristics of the transmitter (UE), it is difficult to adaptively change the number of the first logical Tx antennas according to the receiver.

However, according to the present invention, the configuration of the second logical Tx antennas can be changed by adaptively applying the second MIMO precoder according to the receiver or the state of the receiver. The second logical Tx antennas affect the feedback configuration of the receiver or the pilot configuration of the transmitter, thereby reducing feedback overhead and/or improving accuracy or reducing pilot overhead.

First, to reduce feedback overhead and/or improve accuracy, it is proposed for the receiver to configure CSI feedback information based on an Nr×Nt' effective MIMO channel configured based on the second logical antennas.

The CSI feedback information may include not only implicit information such as a PMI and an RI but also explicit information such as a channel coefficient and a covariance matrix. Specifically, in a proposed structure, information about an Nt'×M MIMO precoder rather than information about an Nt×M MIMO precoder of a conventional structure is fed back as the implicit information and information about an Nr×Nt' channel instead of an Nr×Nt channel of the conventional structure is fed back as the explicit information.

Consequently, according to the present invention, feedback information is configured based on fewer logical antennas than the total number of Tx logical antennas of the transmitter. The second MIMO precoder determines how fewer logical antennas are formed and how to form the logical antennas. Although the transmitter may autonomously determine the configuration of the second MIMO precoder, the receiver may provide information for causing the transmitter to determine the second MIMO precoder. Accordingly, the following 1) and 2) are proposed.

1) The receiver may feed back information necessary for determining the second MIMO precoder to the transmitter through reception of the first non-precoded pilot signal. The feedback information may include at least one of the following a) to d):

a) the preferred number of second logical Tx antennas (Nt')

b) configuration information of a preferred second MIMO precoder c) first logical Tx antenna based CSI feedback information d) channel characteristic information (Doppler property, receiver mobile speed, etc.)

In the above information of a) to d), if c) first logical Tx antenna based CSI feedback information is applied, the total amount of feedback can be optimized in consideration of the amount of second logic Tx antenna based CSI feedback. For example, in an existing system, if first logical antenna based feedback of 100-bit size is performed every 5 msec, feedback of 20 bits per msec is performed. On the other hand, according to the present invention, feedback overhead can be reduced by performing first logical antenna based CSI feedback of 20-bit size every 20 msec and additionally performing second logical antenna based CSI feedback of 50-bit size every 5 msec. That is, feedback of 11 bits per msec is performed. Feedback can be reduced in a similar manner even with respect to a), b), and d) as well as to c).

In order for the receiver to measure and report a second logical antenna based channel, two methods may broadly be considered. A first method is to directly indicate information about the second MIMO precoder to the receiver. As an example of indicating the information, a scheme of configuring some candidates of the second MIMO precoder and informing the receiver of the candidates in the form of candidate indexes may be considered. After receiving the information about the second MIMO precoder, the receiver may measure an NrxNt' effective MIMO channel based on second logical antennas by measuring the first non-precoded pilot signal generated based on first logical antennas. For example, in a system in which a total of 100 first logical antennas (ports #0~#99) is transmitted, if the receiver is informed that the second MIMO precoder of an antenna selection type for selecting only antenna ports #10~#19 is to be used, the receiver may configure CSI feedback information by receiving an effective MIMO channel corresponding to a set of 10 second logical antennas (corresponding to antenna ports #10 to #19).

Although the above scheme can be applied for reduction of feedback overhead and/or improvement of accuracy of the receiver, pilot overhead is not reduced.

Accordingly, a second method may be considered in which a transmitter transmits a new pilot signal (i.e. second non-precoded pilot signal) distinguishable per second logical antenna. In this case, the receiver may directly measure an NrxNt' effective MIMO channel based on the second logical antennas by receiving the second non-precoded pilot signal. Especially, this method can be used to reduce pilot overhead regardless of feedback overhead reduction and/or accuracy improvement.

2) The transmitter may transmit a pilot signal (i.e. a second non-precoded pilot signal) distinguishable per second logical antenna.

The second non-precoded pilot is a signal obtained after passing through a second MIMO precoder but not passing through the first MIMO precoder as illustrated in FIG. 19. When the second non-precoded pilot signal is transmitted along with the first non-precoded pilot signal, the first non-precoded pilot signal may be used for handover, L2 measurement such as cell selection/reselection, or determination of the second MIMO precoder. In this case, the second non-precoded pilot signal may be used for CSI measurement/feedback such as a PMI, an RI, a covariance matrix, and a channel coefficient. A different type of the first non-precoded pilot signal may be transmitted according to usage. For example, a CRS, or a reduced CRS discussed in LTE Rel-12 new carrier type (NCT) may be used for L2 measurement and a CSI-RS may be used for determination of the second MIMO precoder.

When the second non-precoded pilot is introduced, pilot overhead can be reduced. For example, in a system for transmitting a total of 100 non-precoded pilot signals (e.g. CSI-RSs) every 5 msec, pilot overhead may correspond to 20 pilot resources per msec. In this system, assuming that the transmission cycle of the first precoded pilot signals increases to 20 msec, the proposed second pilot signals are transmitted every 5 msec, and the number of second logical antennas is reduced to 20 by the second MIMO precoder, overall pilot overhead is 9 pilot resources per msec, which is reduced by twice or more the pilot overhead of the above example.

In addition, since the second precoding pilot signals are determined according to a channel environment between the transmitter and the receiver, pilot overhead such as the transmission cycle of the second precoded pilot signals or the frequency transmission density of the second precoded pilot signals can be optimized by the channel situation of the receiver.

If the second MIMO precoder adaptively configures the number of Tx antennas according to mobility of the UE or a Doppler characteristic using the structure proposed in the present invention, the UE can perform feedback according to the corresponding number of antennas. For instance, in an environment in which the number of first logical antennas is 8 as illustrated in FIG. 16, the second MIMO precoder may adaptively configure 8 second logical antennas when the UE has a low-mobility characteristic, 4 second logical antennas when the UE has a middle-mobility characteristic, and one second logical antenna when the UE has a high-mobility.

When such adaptive partial array beamforming is applied in a 3D beamforming environment, dimensions may be independently controlled with respect to pilot signals transmitted in the vertical direction and horizontal direction of an antenna array. In addition, dimensions may also be independently controlled with respect to information to be fed back by the receiver in the vertical direction and horizontal direction of the antenna array.

Meanwhile, there is a high probability that the number of antennas of the eNB is much more than the number of antennas of the UE in a massive antenna array system. Applying the proposed structure, sub-array based multi-user beamforming is easily supported.

Figure 23:
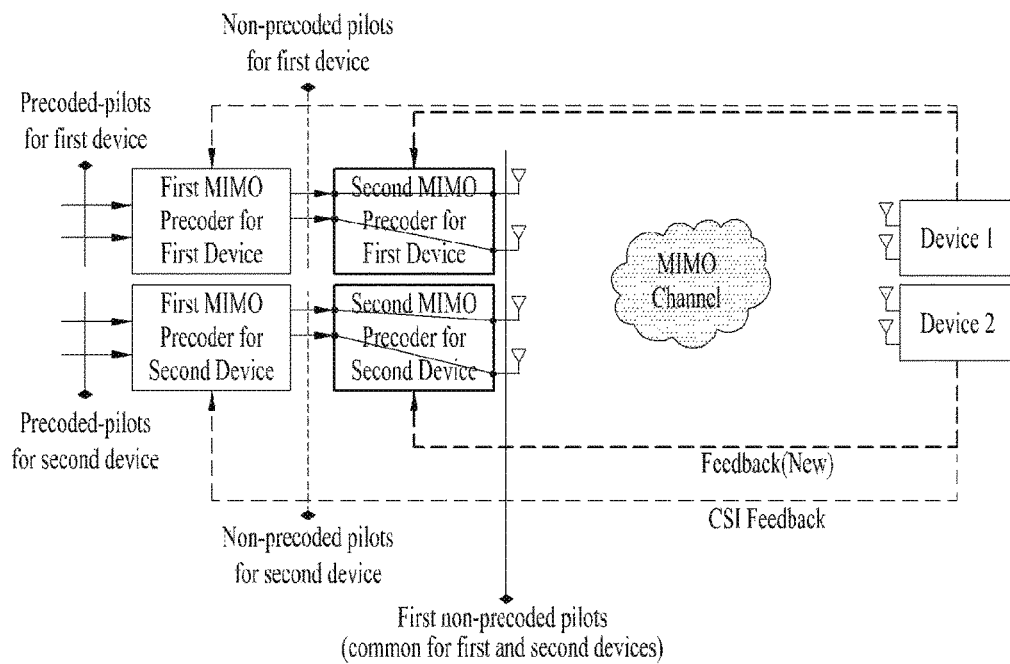
FIG. 23 illustrates a communication system supporting sub-array based multi-user beamforming according to the fourth embodiment of the present invention.

FIG. 23 illustrates a communication system supporting sub-array based multi-user beamforming according to a fourth embodiment of the present invention.

Referring to FIG. 23, when an eNB includes 100 antennas and five UEs are present in coverage of the eNB, the eNB may support the five UEs using 20 antennas dividing 100 antennas by 5. Although 20 or more antennas may be supported per UE in the case in which two or more UEs are supported by one antenna, that is, a plurality of UEs is mapped to one antenna in a UE-to-antenna mapping relationship, this is excluded for convenience of description.

Then, each UE configures feedback based on 20 second logical antennas, thereby reducing feedback overhead and/or improving accuracy. Although a total of 100 pilot resources is used in terms of the eNB because the overhead of second non-precoded pilot signals is 20 pilot resources per UE, the eNB may independently controls the transmission cycle or frequency density of the second non-precoded pilot signals according to a situation of each UE. Therefore, actual pilot overhead reduction and/or accuracy can be remarkably improved relative to a conventional system.

Figure 24:
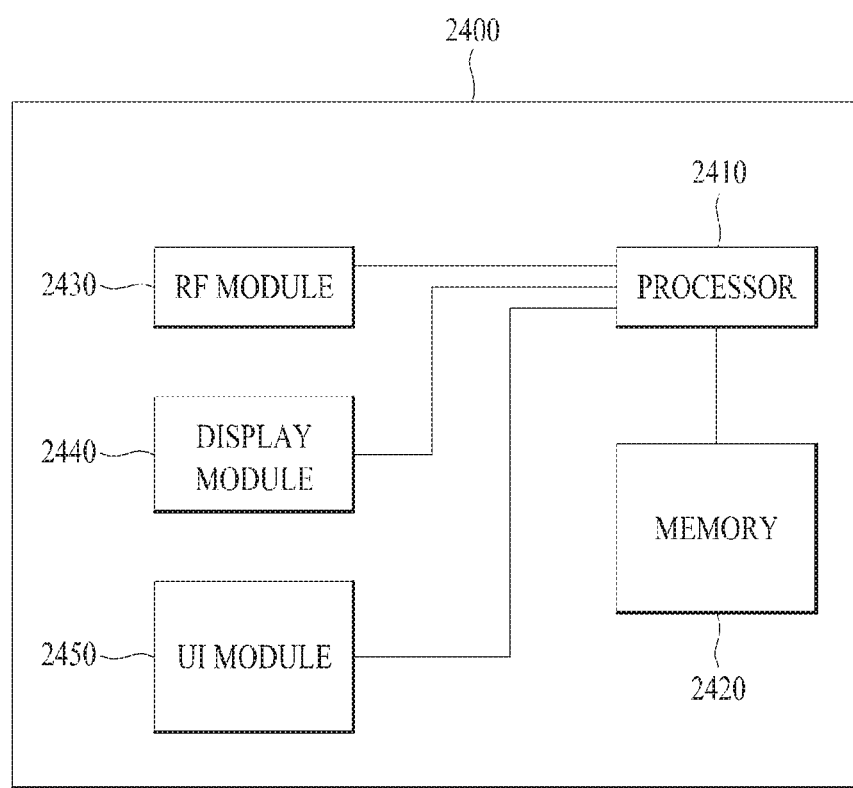
FIG. 24 is a block diagram of a communication apparatus according to an embodiment of the present invention.

FIG. 24 is a block diagram of a communication apparatus according to an embodiment of the present invention.

Referring to FIG. 24, a communication device 2400 includes a processor 2410, a memory 2420, a radio frequency (RF) module 2430, a display module 2440, and a user interface (UI) module 2450.

The communication device 2400 is illustrated for convenience of description and some modules may be omitted. The communication device 2400 may further include necessary modules. Some modules of the communication device 2400 may be further divided into sub-modules. The processor 2400 is configured to perform operations according to the embodiments of the present invention exemplarily described with reference to the drawings. Specifically, for a detailed description of operations of the processor 2400, reference may be made to the description described with reference to FIGS. 1 to 23.

The memory 2420 is connected to the processor 2410 and stores operating systems, applications, program code, data, and the like. The RF module 2430 is connected to the processor 2410 and performs a function of converting a baseband signal into a radio signal or converting a radio signal into a baseband signal. For this, the RF module 2430 performs analog conversion, amplification, filtering, and frequency upconversion or performs inverse processes thereof. The display module 2440 is connected to the processor 2410 and displays various types of information. The display module 2440 may include, but is not limited to, a well-known element such as a liquid crystal display (LCD), a light emitting diode (LED), or an organic light emitting diode (OLED). The UI module 2450 is connected to the processor 2410 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features.

Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

MODE FOR INVENTION

Various embodiments have been described in the best mode for carrying out the invention.

INDUSTRIAL APPLICABILITY

While the method and apparatus for performing precoding for adaptive antenna scaling in a wireless communication system have been described in the context of a 3GPP LTE system, the present invention is also applicable to many other wireless communication systems in addition to 3GPP LTE. In addition, the method and apparatus may be applied to antenna structures other than a massive antenna structure.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

The invention claimed is:

1. A method for transmitting a signal to a receiver by a transmitter in a wireless communication system, the method comprising:
    mapping one or more transmission steams to first logical antenna ports;
    mapping signals mapped to the first logical antenna ports to second logical antenna ports; and
    mapping signals mapped to the second logical antenna ports to physical antennas to transmit the signals mapped to the physical antennas to the receiver,
    wherein the number of the first logical antenna ports is less than or equal to the number of the second logical antenna ports and varies with a channel state between the transmitter and the receiver.

2. The method according to claim 1, wherein the mapping signals to the second logical antenna ports comprises mapping first non-precoded pilot signals to the second logical antenna ports and wherein the mapping signals to the physical antennas comprises mapping second non-precoded pilot signals to the physical antennas.

3. The method according to claim 2, wherein the first non-precoded pilot signals are pilot signals for channel state information measurement at the receiver, and
    wherein the second non-precoded pilot signals are common pilot signals for determining the number of the first logical antenna ports.

4. The method according to claim 1, wherein the mapping signals to first logical antenna ports comprises mapping receiver-specific precoded pilot signals to the first logical antenna ports.

5. The method according to claim 1, further comprising receiving information about a channel state between the transmitter and the receiver from the receiver to determine the number of the first logical antenna ports.

6. The method according to claim 1, further comprising transmitting information about a mapping relationship between the first logical antenna ports and the second logical antenna ports to the receiver.

7. A transmitter in a wireless communication system, the transmitter comprising:
a processor to:
map one or more transmission steams to first logical antenna ports;
map signals mapped to the first logical antenna ports to second logical antenna ports; and
map signals mapped to the second logical antenna ports to physical antennas to transmit the signals mapped to the second logical antenna ports,
wherein the number of the first logical antenna ports is less than or equal to the number of the second logical antenna ports and varies with a channel state between the transmitter and a receiver.

8. The transmitter according to claim 7, wherein the processor maps first non-precoded pilot signals to the second logical antenna ports and wherein the processor maps second non-precoded pilot signals to the physical antennas.

9. The transmitter according to claim 8, wherein the first non-precoded pilot signals are pilot signals for channel state information measurement at the receiver, and
wherein the second non-precoded pilot signals are common pilot signals for determining the number of the first logical antenna ports.

10. The transmitter according to claim 7, wherein the processor maps receiver-specific precoded pilot signals to the first logical antenna ports.

11. The transmitter according to claim 7, wherein information about a channel state between the transmitter and the receiver is received from the receiver to determine the number of the first logical antenna ports.

12. The transmitter according to claim 7, wherein information about a mapping relationship between the first logical antenna ports and the second logical antenna ports is transmitted to the receiver.

* * * * *